(12) United States Patent
Fukaya

(10) Patent No.: US 11,914,113 B2
(45) Date of Patent: Feb. 27, 2024

(54) IMAGING LENS

(71) Applicant: TOKYO VISIONARY OPTICS CO., LTD., Tokyo (JP)

(72) Inventor: Hisao Fukaya, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 0 days.

(21) Appl. No.: 17/391,638

(22) Filed: Aug. 2, 2021

(65) Prior Publication Data

US 2022/0163773 A1 May 26, 2022

Related U.S. Application Data

(63) Continuation of application No. 16/421,046, filed on May 23, 2019, now Pat. No. 11,307,386.

(30) Foreign Application Priority Data

May 23, 2018 (JP) ................................. 2018-098997

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 9,523,841 | B1 * | 12/2016 | Chen ...................... G02B 5/005 |
| 2017/0199355 | A1 | 7/2017 | Kitahara et al. |
| 2019/0285863 | A1 * | 9/2019 | Yang ....................... G02B 9/64 |

FOREIGN PATENT DOCUMENTS

JP 2017-125887 7/2017

* cited by examiner

*Primary Examiner* — Collin X Beatty
(74) *Attorney, Agent, or Firm* — Hamre, Schumann, Mueller & Larson, P.C.

(57) ABSTRACT

There is provided an imaging lens with high-resolution which satisfies demand of the wide field of view, the low-profileness and the low F-number, and has excellent optical characteristics. An imaging lens comprises in order from an object side to an image side, a first lens having a convex surface facing the object side near an optical axis and positive refractive power, a second lens, a third lens, a fourth lens, a fifth lens, a sixth lens, and a seventh lens having a concave surface facing the image side near the optical axis and negative refractive power, wherein an image-side surface of said seventh lens is formed as an aspheric surface having at least one pole point in a position off the optical axis, said second lens has positive refractive power near the optical axis, and said sixth lens has plane surfaces both on the object side and the image side and is formed as a double-sided aspheric lens.

9 Claims, 22 Drawing Sheets

IMAGING LENS

The present application is based on and claims priority of a Japanese patent application No. 2018-098997 filed on May 23, 2018, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in a smartphone and a mobile phone which become increasingly compact and excellent in performance, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and to have high-resolution performance.

As a conventional imaging lens aiming high performance, for example, the imaging lens disclosed in Patent Document 1 (JP2017-125887A) has been known.

Patent Document 1 discloses an imaging lens comprising, in order from an object side, a first lens having negative refractive power, a second lens having negative refractive power, a third lens having positive refractive power, a fourth lens having negative refractive power, a fifth lens having positive refractive power, a sixth lens having positive refractive power, and a seventh lens having negative refractive power.

SUMMARY OF THE INVENTION

In lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "A Total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens having a convex surface facing the object side near an optical axis, a second lens, a third lens, a fourth lens, a fifth lens, a sixth lens being a double-sided aspheric lens, and a seventh lens having a concave surface facing the image side near the optical axis and having negative refractive power, wherein an image-side surface of the seventh lens is formed as an aspheric surface having at least one pole point in a position off the optical axis.

According to the imaging lens having the above-described configuration, the first lens properly corrects spherical aberration and distortion by having the convex surface facing the object side near the optical axis. The second lens properly corrects astigmatism and the distortion. The third lens properly corrects the spherical aberration, coma aberration and chromatic aberration. The fourth lens properly corrects the astigmatism and the distortion. The fifth lens properly corrects the astigmatism, field curvature and the distortion. The sixth lens properly corrects aberrations at a peripheral area by aspheric surfaces formed on both side surfaces. The seventh lens secures back focus while maintaining low-profileness. An image-side surface of the seventh lens is a concave surface facing the image side near the optical axis, and the field curvature and the distortion can be properly corrected and a light ray incident angle to an image sensor can be properly controlled by forming the aspheric surface having at least one pole point in a position off the optical axis.

According to the imaging lens having the above-described configuration, it is preferable that the second lens has positive refractive power near the optical axis.

When the refractive power of the second lens is positive, a total track length can be shortened and the astigmatism can be properly corrected.

According to the imaging lens having the above-described configuration, it is preferable that an image-side surface of the fourth lens has a concave surface facing the image side near the optical axis.

When the image-side surface of the fourth lens has the concave surface facing the image side near the optical axis, the astigmatism and the distortion can be properly corrected.

According to the imaging lens having the above-described configuration, it is preferable that the fifth lens has the positive refractive power near the optical axis.

When the refractive power of the fifth lens is positive, the low-profileness is more facilitated.

According to the imaging lens having the above-described configuration, it is preferable that the sixth lens has plane surfaces both on the object side and the image side near the optical axis.

When the sixth lens has the plane surfaces both on the object side and the image side near the optical axis, aberrations at a peripheral area can be properly corrected by the aspheric surfaces on both side surfaces without affecting refractive power of an overall optical system of the imaging lens.

According to the imaging lens having the above-described configuration, it is preferable that an object-side surface of the seventh lens has a convex surface facing the object side near the optical axis.

When the object-side surface of the seventh lens has a convex surface facing the object side near the optical axis, the astigmatism and the field curvature can be properly corrected.

According to the imaging lens having the above-described configuration, it is preferable that a below conditional expression (1) is satisfied:

$$1.50 < (D1/f1) \times 100 < 17.00 \quad (1)$$

where
D1: a thickness along the optical axis of the first lens, and
f1: a focal length of the first lens.

The conditional expression (1) defines an appropriate range of a thickness along the optical axis of the first lens. When a value is below the upper limit of the conditional expression (1), the thickness along the optical axis of the first lens is suppressed from being too large, and an air gap of the image side of the first lens can be easily secured. As a result, the low-profileness can be maintained. On the other hand, when the value is above the lower limit of the conditional expression (1), the thickness along the optical axis of the first lens is suppressed from being too small, and formability of the lens becomes excellent.

According to the imaging lens having the above-described configuration, it is preferable that a below conditional expression (2) is satisfied:

$$0.02 < T2/T4 < 0.10 \quad (2)$$

where
T2: a distance along the optical axis from an image-side surface of the second lens to an object-side surface of the third lens, and
T4: a distance along the optical axis from an image-side surface of the fourth lens to an object-side surface of the fifth lens.

The conditional expression (2) defines an appropriate range of a distance between the second lens and the third lens and a distance between the fourth lens and the fifth lens. By satisfying the conditional expression (2), difference of the distance between the second lens and the third lens and the distance between the fourth lens and the fifth lens is suppressed from being large, and the low-profileness is achieved. Furthermore, by satisfying the conditional expression (2), the third lens and the fourth lens are arranged at an optimum position, and aberration correction function of the lens becomes more effective.

According to the imaging lens having the above-described configuration, it is preferable that a below conditional expression (3) is satisfied:

$$0.10 < vd4/(vd5+vd6) < 0.40 \quad (3)$$

where
vd4: an abbe number at d-ray of the fourth lens,
vd5: an abbe number at d-ray of the fifth lens, and
vd6: an abbe number at d-ray of the sixth lens.

The conditional expression (3) defines an appropriate range of the respective abbe numbers at d-ray of the fourth lens, fifth lens and sixth lens. By satisfying the conditional expression (3), the chromatic aberration can be properly corrected.

According to the imaging lens having the above-described configuration, it is preferable that a below conditional expression (4) is satisfied:

$$1.50 < (D5/f5) \times 100 < 12.50 \quad (4)$$

where
D5: a thickness along the optical axis of the fifth lens, and
f5: a focal length of the fifth lens.

The conditional expression (4) defines an appropriate range of a thickness along the optical axis of the fifth lens. When a value is below the upper limit of the conditional expression (4), the thickness along the optical axis of the fifth lens is suppressed from being too large, and air gaps of the object side and the image side of the fifth lens can be easily secured. As a result, the low-profileness can be maintained. On the other hand, when the value is above the lower limit of the conditional expression (4), the thickness along the optical axis of the fifth lens is suppressed from being too small, and the formability of the lens becomes excellent.

According to the imaging lens having the above-described configuration, it is preferable that a below conditional expression (5) is satisfied:

$$0.20 < (T2/TTL) \times 100 < 0.90 \quad (5)$$

where
T2: a distance along the optical axis from an image-side surface of the second lens to an object-side surface of the third lens, and
TTL: a total track length.

The conditional expression (5) defines an appropriate range of the distance along the optical axis between the second lens and the third lens. By satisfying the conditional expression (5), the astigmatism and the field curvature can be properly corrected.

According to the imaging lens having the above-described configuration, it is preferable that a below conditional expression (6) is satisfied:

$$6.70 < (T4/TTL) \times 100 < 15.00 \quad (6)$$

where
T4: a distance along the optical axis from an image-side surface of the fourth lens to an object-side surface of the fifth lens, and
TTL: a total track length.

The conditional expression (6) defines an appropriate range of the distance along the optical axis between the fourth lens and the fifth lens. By satisfying the conditional expression (6), the distortion can be properly corrected.

According to the imaging lens having the above-described configuration, it is preferable that a below conditional expression (7) is satisfied:

$$2.00 < f4/f < 16.00 \quad (7)$$

where
f4: a focal length of the fourth lens, and
f: the focal length of the overall optical system of the imaging lens.

The conditional expression (7) defines an appropriate range of refractive power of the fourth lens. When a value is below the upper limit of the conditional expression (7), positive refractive power of the fourth lens becomes appropriate and the low-profileness can be achieved. On the other hand, when the value is above the lower limit of the conditional expression (7), the astigmatism, the field curvature and the distortion can be properly corrected.

According to the imaging lens having the above-described configuration, it is preferable that a below conditional expression (8) is satisfied:

$$0.50 < f5/f < 3.00 \quad (8)$$

where
f5: a focal length of the fifth lens, and
f: the focal length of the overall optical system of the imaging lens.

The conditional expression (8) defines an appropriate range of refractive power of the fifth lens. When a value is below the upper limit of the conditional expression (8), positive refractive power of the fifth lens becomes appropriate and the low-profileness can be achieved. On the other hand, when the value is above the lower limit of the conditional expression (8), the astigmatism, the field curvature and the distortion can be properly corrected.

According to the imaging lens having the above-described configuration, it is preferable that a below conditional expression (9) is satisfied:

$$-1.40 < f7/f < -0.40 \quad (9)$$

where
f7: a focal length of the seventh lens, and
f: the focal length of the overall optical system of the imaging lens.

The conditional expression (9) defines an appropriate range of refractive power of the seventh lens. When a value is below the upper limit of the conditional expression (9), negative refractive power of the seventh lens becomes appropriate and it is favorable for the low-profileness. On the other hand, when the value is above the lower limit of the conditional expression (9), the chromatic aberration, the astigmatism and the distortion can be properly corrected.

According to the imaging lens having the above-described configuration, it is preferable that a below conditional expression (10) is satisfied:

$$0.40 < r7/f < 1.90 \quad (10)$$

where
r7: paraxial curvature radius of an object-side surface of the fourth lens, and
f: the focal length of the overall optical system of the imaging lens.

The conditional expression (10) defines an appropriate range of the paraxial curvature radius of the object-side surface of the fourth lens. When a value is below the upper limit of the conditional expression (10), the coma aberration can be properly corrected. On the other hand, when the value is above the lower limit of the conditional expression (10), the astigmatism and the distortion can be properly corrected.

According to the imaging lens having the above-described configuration, it is preferable that a below conditional expression (11) is satisfied:

$$0.50 < r8/f < 2.60 \quad (11)$$

where
r8: paraxial curvature radius of the image-side surface of the fourth lens, and
f: the focal length of the overall optical system of the imaging lens.

The conditional expression (11) defines an appropriate range of the paraxial curvature radius of the image-side surface of the fourth lens. When a value is below the upper limit of the conditional expression (11), the astigmatism and the distortion can be properly corrected. On the other hand, when the value is above the lower limit of the conditional expression (11), the coma aberration can be properly corrected.

According to the imaging lens having the above-described configuration, it is preferable that a below conditional expression (12) is satisfied:

$$-3.50 < r9/f < -0.50 \quad (12)$$

where
r9: paraxial curvature radius of an object-side surface of the fifth lens, and
f: the focal length of the overall optical system of the imaging lens.

The conditional expression (12) defines an appropriate range of the paraxial curvature radius of the object-side surface of the fifth lens. When a value is below the upper limit of the conditional expression (12), the spherical aberration can be properly corrected. On the other hand, when the value is above the lower limit of the conditional expression (12), the astigmatism, field curvature and the distortion can be properly corrected.

According to the imaging lens having the above-described configuration, it is preferable that a below conditional expression (13) is satisfied:

$$0.70 < r13/f < 6.50 \quad (13)$$

where
r13: paraxial curvature radius of an object-side surface of the seventh lens, and
f: the focal length of the overall optical system of the imaging lens.

The conditional expression (13) defines an appropriate range of the paraxial curvature radius of the object-side surface of the seventh lens. When a value is below the upper limit of the conditional expression (13), the field curvature can be properly corrected. On the other hand, when the value is above the lower limit of the conditional expression (13), the astigmatism and the distortion can be properly corrected.

According to the imaging lens having the above-described configuration, it is preferable that a below conditional expression (14) is satisfied:

$$0.40 < r6/r7 < 1.60 \quad (14)$$

where
r6: paraxial curvature radius of an image-side surface of the third lens, and
r7: paraxial curvature radius of an object-side surface of the fourth lens.

The conditional expression (14) defines relationship between paraxial curvature radii of the image-side surface of the third lens and the object-side surface of the fourth lens. By satisfying the conditional expression (14), refractive powers of the image-side surface of the third lens and the object-side surface of the fourth lens are suppressed from being excessive. As a result, the coma aberration, the astigmatism and the distortion can be properly corrected.

According to the imaging lens having the above-described configuration, it is preferable that a below conditional expression (15) is satisfied:

$$0.30 < r7/r8 < 1.30 \quad (15)$$

where
r7: paraxial curvature radius of an object-side surface of the fourth lens, and
r8: paraxial curvature radius of an image-side surface of the fourth lens.

The conditional expression (15) defines relationship between paraxial curvature radii of the object-side surface and the image-side surface of the fourth lens. By satisfying the conditional expression (15), refractive powers of the object-side surface and the image-side surface of the fourth lens are suppressed from being excessive. As a result, the coma aberration, the astigmatism and the distortion can be properly corrected. Furthermore, an effect of reducing sensitivity to a manufacturing error of the fourth lens can be obtained.

According to the imaging lens having the above-described configuration, it is preferable that a below conditional expression (16) is satisfied:

$$-1.90 < r8/r9 < -0.30 \qquad (16)$$

where
r8: paraxial curvature radius of an image-side surface of the fourth lens, and
r9: paraxial curvature radius of an object-side surface of the fifth lens.

The conditional expression (16) defines relationship between paraxial curvature radii of the image-side surface of the fourth lens and the object-side surface of the fifth lens. By satisfying the conditional expression (16), refractive powers of the image-side surface of the fourth lens and the object-side surface of the fifth lens are suppressed from being excessive. As a result, the coma aberration, the astigmatism and the distortion can be properly corrected.

According to the imaging lens having the above-described configuration, it is preferable that a below conditional expression (17) is satisfied:

$$0.15 < vd6/vd7 < 0.55 \qquad (17)$$

where
vd6: an abbe number at d-ray of the sixth lens, and
vd7: an abbe number at d-ray of the seventh lens.

The conditional expression (17) defines an appropriate range of the respective abbe numbers at d-ray of the sixth lens and the seventh lens. By satisfying the conditional expression (17), the chromatic aberration can be properly corrected.

According to the imaging lens having the above-described configuration, it is preferable that a below conditional expression (18) is satisfied:

$$2.10 < T1/T2 < 8.30 \qquad (18)$$

where
T1: a distance along the optical axis from an image-side surface of the first lens to an object-side surface of the second lens, and
T2: a distance along the optical axis from an image-side surface of the second lens to an object-side surface of the third lens.

The conditional expression (18) defines an appropriate range of a distance between the first lens and the second lens and a distance between the second lens and the third lens. By satisfying the conditional expression (18), difference of the distance between the first lens and the second lens and the distance between the second lens and the third lens is suppressed from being large, and the low-profileness is achieved. Furthermore, by satisfying the conditional expression (18), the second lens are arranged at an optimum position, and aberration correction function of the lens becomes more effective.

According to the imaging lens having the above-described configuration, it is preferable that a below conditional expression (19) is satisfied:

$$1.20 < |f5/f7| < 3.40 \qquad (19)$$

where
f5: a focal length of the fifth lens, and
f7: a focal length of the seventh lens.

The conditional expression (19) defines an appropriate range of refractive powers of the fifth lens and the seventh lens. By satisfying the conditional expression (19), the coma aberration, the astigmatism and the distortion can be properly corrected.

According to the imaging lens having the above-described configuration, it is preferable that composite refractive power of the sixth lens and the seventh lens is negative, and more preferable that a below conditional expression (20) is satisfied:

$$-1.35 < f67/f < -0.40 \qquad (20)$$

where
f67: a composite focal length of the sixth lens and the seventh lens, and
f: the focal length of the overall optical system of the imaging lens.

When the composite refractive power of the sixth lens and the seventh lens is negative, it is favorable for correction of the chromatic aberration. The conditional expression (20) defines an appropriate range of the composite refractive power of the sixth lens and the seventh lens. When a value is below the upper limit of the conditional expression (20), the negative composite refractive power of the sixth lens and the seventh lens becomes appropriate, and the low-profileness can be achieved. On the other hand, when the value is above the lower limit of the conditional expression (20), the astigmatism, the field curvature and the distortion can be properly corrected.

According to the imaging lens having the above-described configuration, it is preferable that a below conditional expression (21) is satisfied:

$$-1.00 < r10/f < -0.20 \qquad (21)$$

where
r10: paraxial curvature radius of an image-side surface of the fifth lens, and
f: the focal length of the overall optical system of the imaging lens.

The conditional expression (21) defines an appropriate range of the paraxial curvature radius of the image-side surface of the fifth lens. By satisfying the conditional expression (21), the coma aberration, the astigmatism, the field curvature and the distortion can be properly corrected.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9, 11, 13, 15, 17, 19 and 21 are schematic views of the imaging lenses in Examples 1 to 11 according to the embodiments of the present invention, respectively.

Figure 1:
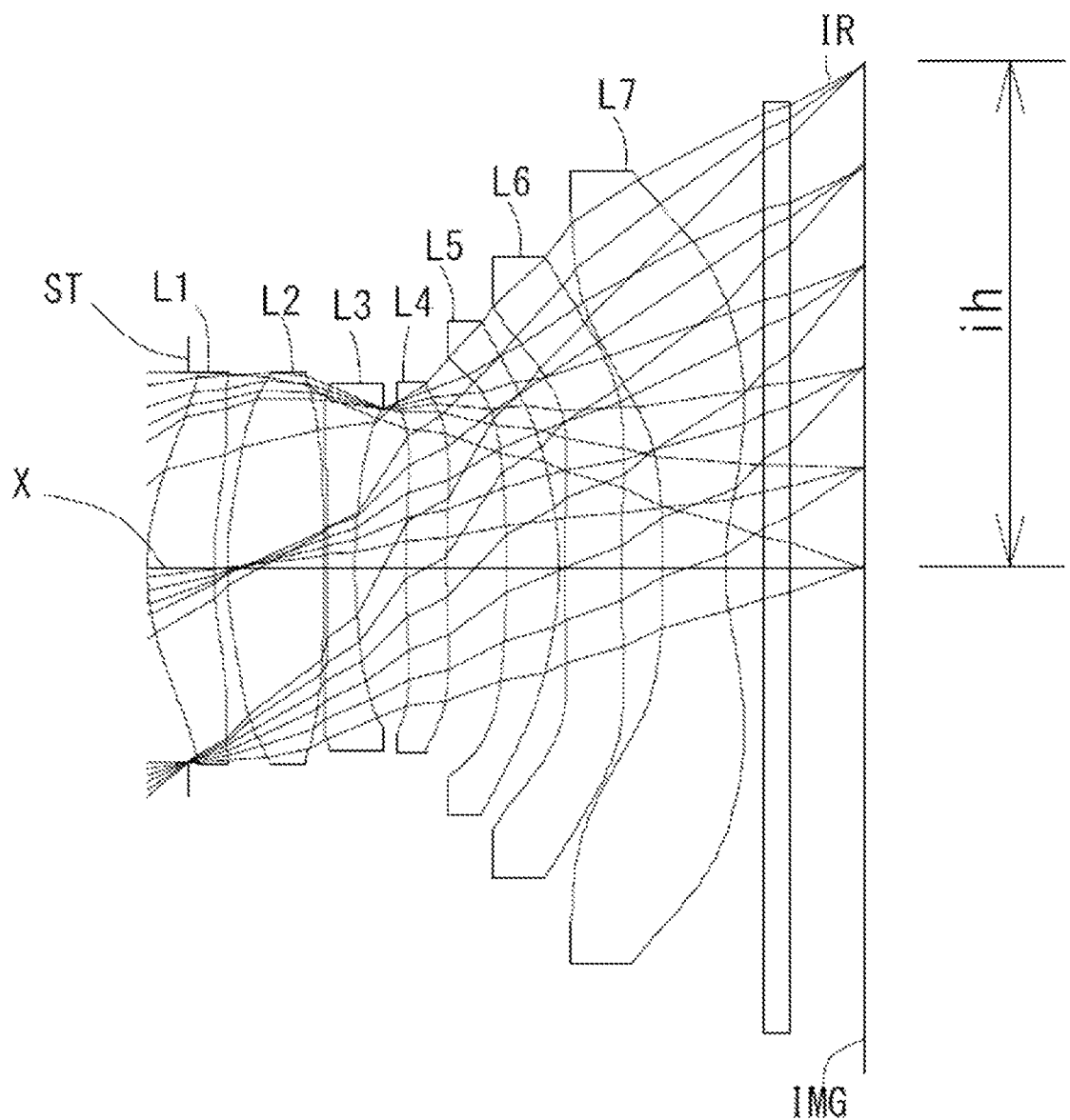
FIG. 1 is a schematic view showing an imaging lens in Example 1 according to the present invention.

As shown in FIG. 1, the imaging lens according to the present embodiment comprises in order from an object side to an image side, a first lens L1 having a convex surface facing the object side near an optical axis X and having positive refractive power, a second lens L2, a third lens L3, a fourth lens L4, a fifth lens L5, a sixth lens L6, and a seventh lens L7 having a concave surface facing the image side near the optical axis X and having negative refractive power. An image-side surface of the seventh lens L7 is formed as an aspheric surface having at least one pole point in a position off the optical axis X.

A filter IR such as an IR cut filter and a cover glass are arranged between the seventh lens L7 and an image plane IMG (namely, the image plane of an image sensor). The filter IR is omissible.

By arranging an aperture stop ST on the object side of the first lens L1, correction of aberrations and control of an incident angle of the light ray of high image height to the image sensor become facilitated.

The first lens L1 has a meniscus shape having a convex surface facing the object side and a concave surface facing the image side near the optical axis X. Therefore, spherical aberration, astigmatism and distortion can be properly corrected.

The second lens L2 has positive refractive power and has a biconvex shape having convex surfaces facing the object side and the image side near the optical axis X. Therefore, the astigmatism and the distortion can be properly corrected. Furthermore, the biconvex shape suppresses curvature from being large, and effectively reduces sensitivity to a manufacturing error. A shape of the second lens L2 may be a meniscus shape having the convex surface facing the object side and the concave surface facing the image side near the optical axis X as in the Examples 4, 5, 6, 7, 8 and 9 shown in FIGS. 7, 9, 11, 13, 15 and 17. In this case, the spherical aberration, the astigmatism and field curvature and the distortion can be properly corrected.

The third lens L3 has negative refractive power and has a biconcave shape having concave surfaces facing the object side and the image side near the optical axis X. Therefore, the spherical aberration, coma aberration and chromatic aberration can be properly corrected. Furthermore, the biconcave shape suppresses curvature from being large, and reduces sensitivity to a manufacturing error. A shape of the third lens L3 may be a meniscus shape having the convex surface facing the object side and the concave surface facing the image side near the optical axis X as in the Examples 3 to 11 shown in FIGS. 5, 7, 9, 11, 13, 15, 17, 19 and 21. In this case, the astigmatism, the field curvature and the distortion can be properly corrected.

The fourth lens L4 has positive refractive power and has a meniscus shape having a convex surface facing the object side and a concave surface facing the image side near the optical axis X. Therefore, the coma aberration, the astigmatism and the distortion can be properly corrected.

The fifth lens L5 has positive refractive power and has a meniscus shape having a convex surface facing the object side and a concave surface facing the image side near the optical axis X. Therefore, a light ray incident angle to the fifth lens L5 becomes appropriate, and the astigmatism, the field curvature and the distortion can be properly corrected.

The sixth lens L6 has plane surfaces both on the object side and the image side near the optical axis X, and substantially has no refractive power near the optical axis X. Therefore, aberrations at a peripheral area can be properly corrected by the aspheric surfaces on both sides without affecting refractive power of an overall optical system of the imaging lens.

The seventh lens L7 has negative refractive power and has a meniscus shape having a convex surface facing the object side and a concave surface facing the image side near the optical axis X. Therefore, a back focus can be secured while maintaining the low-profileness, and the chromatic aberration, the astigmatism, the field curvature and the distortion can be properly corrected.

The image-side surface of the seventh lens L7 is formed as an aspheric surface having at least one pole point in a position off the optical axis X. Therefore, the field curvature and the distortion can be properly corrected and the light ray incident angle to the image sensor is appropriately controlled.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with the case in which a cemented lens is used, workload is reduced, and manufacturing in low cost becomes possible.

Furthermore, the imaging lens according to the present embodiments makes manufacturing facilitated by using plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (21).

$$1.50 < (D1/f1) \times 100 < 17.00 \tag{1}$$

$$0.02 < T2/T4 < 0.10 \tag{2}$$

$$0.10 < vd4/(vd5+vd6) < 0.40 \tag{3}$$

$$1.50 < (D5/f5) \times 100 < 12.50 \tag{4}$$

$$0.20 < (T2/TTL) \times 100 < 0.90 \tag{5}$$

$$6.70 < (T4/TTL) \times 100 < 15.00 \tag{6}$$

$$2.00 < f4/f < 16.00 \tag{7}$$

$$0.50 < f5/f < 3.00 \tag{8}$$

$$-1.40 < f7/f < -0.40 \tag{9}$$

$$0.40 < r7/f < 1.90 \tag{10}$$

$$0.50 < r8/f < 2.60 \tag{11}$$

$$-3.50 < r9/f < -0.50 \tag{12}$$

$$0.70 < r13/f < 6.50 \tag{13}$$

$$0.40 < r6/r7 < 1.60 \tag{14}$$

$$0.30 < r7/r8 < 1.30 \tag{15}$$

$$-1.90 < r8/r9 < -0.30 \tag{16}$$

$$0.15 < vd6/vd7 < 0.55 \tag{17}$$

$$2.10 < T1/T2 < 8.30 \tag{18}$$

$$1.20 < |f5/f7| < 3.40 \tag{19}$$

$$-1.35 < f67/f < -0.40 \tag{20}$$

$$-1.00 < r10/f < -0.20 \tag{21}$$

where
vd4: an abbe number at d-ray of the fourth lens L4,
vd5: an abbe number at d-ray of the fifth lens L5,
vd6: an abbe number at d-ray of the sixth lens L6,
vd7: an abbe number at d-ray of the seventh lens L7,
D1: a thickness along the optical axis X of the first lens L1,
D5: a thickness along the optical axis X of the fifth lens L5,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T4: a distance along the optical axis X from an image-side surface of the fourth lens L4 to an object-side surface of the fifth lens L5,
TTL: a total track length,
f: the focal length of the overall optical system of the imaging lens,
f1: a focal length of the first lens L1,
f4: a focal length of the fourth lens L4,
f5: a focal length of the fifth lens L5,
f7: a focal length of the seventh lens L7,
f67: a composite focal length of the sixth lens L6 and the seventh lens L7,
r6: paraxial curvature radius of an image-side surface of the third lens L3,
r7: paraxial curvature radius of an object-side surface of the fourth lens L4,
r8: paraxial curvature radius of the image-side surface of the fourth lens L4,
r9: paraxial curvature radius of an object-side surface of the fifth lens L5,
r10: paraxial curvature radius of an image-side surface of the fifth lens L5, and
r13: paraxial curvature radius of an object-side surface of the seventh lens L7.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (21a).

$$3.00 < (D1/f1) \times 100 < 13.50 \tag{1a}$$

$$0.04 < T2/T4 < 0.08 \tag{2a}$$

$$0.20 < vd4/(vd5+vd6) < 0.35 \tag{3a}$$

$$2.80 < (D5/f5) \times 100 < 10.50 \tag{4a}$$

$$0.40 < (T2/TTL) \times 100 < 0.75 \tag{5a}$$

$$7.50 < (T4/TTL) \times 100 < 12.50 \tag{6a}$$

$$3.50 < f4/f < 13.00 \tag{7a}$$

$$0.90 < f5/f < 2.50 \tag{8a}$$

$$-1.10 < f7/f < -0.60 \tag{9a}$$

$$0.60 < r7/f < 1.50 \tag{10a}$$

$$0.75 < r8/f < 2.10 \tag{11a}$$

$$-2.90 < r9/f < -0.80 \tag{12a}$$

$$1.10 < r13/f < 5.20 \tag{13a}$$

$$0.60 < r6/r7 < 1.30 \tag{14a}$$

$$0.50 < r7/r8 < 1.10 \tag{15a}$$

$$-1.50 < r8/r9 < -0.50 \tag{16a}$$

$$0.25 < vd6/vd7 < 0.45 \tag{17a}$$

$$2.35 < T1/T2 < 6.90 \tag{18a}$$

$1.40<|f5/f7|<2.80$ (19a)

$-1.10<f67/f<-0.60$ (20a)

$-0.85<r10/f<-0.30$ (21a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 +$$

Equation 1

$$A_{10}H^{10} + A_{12}H^{12} + A_{14}H^{14} + A_{16}H^{16} + A_{18}H^{18} + A_{20}H^{20}$$

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes a total track length. Additionally, i denotes surface number counted from the object side, r denotes paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 4.89  ih = 3.93  Fno = 1.60  TTL = 5.53  ω(°) = 39.4

| Surface Data Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.3204 | | |
| 2* | 2.0736 | 0.5200 | 1.544 | 55.86 (vd1) |
| 3* | 2.9209 | 0.1037 | | |
| 4* | 2.8004 | 0.7538 | 1.544 | 55.86 (vd2) |
| 5* | −68.9188 | 0.0300 | | |
| 6* | −44.9878 | 0.2200 | 1.651 | 20.37 (vd3) |
| 7* | 5.3647 | 0.3910 | | |
| 8* | 5.1596 | 0.3197 | 1.651 | 20.37 (vd4) |
| 9* | 6.8870 | 0.4725 | | |
| 10* | −8.2557 | 0.4116 | 1.535 | 55.86 (vd5) |
| 11* | −2.5130 | 0.0451 | | |
| 12* | Infinity | 0.4500 | 1.661 | 20.37 (vd6) |
| 13* | Infinity | 0.3023 | | |
| 14* | 17.3547 | 0.5021 | 1.535 | 55.86 (vd7) |
| 15* | 1.8586 | 0.3000 | | |
| 18 | Infinity | 0.2100 | 1.517 | 64.20 |
| 19 | Infinity | 0.5740 | | |
| Image Plane | Infinity | | | |

| Constituent Lens Data | | | |
|---|---|---|---|
| Lens | Start Surface | Focal Length | Composite Focal Length |
| 1 | 2 | 10.798 | f67   −3.936 |
| 2 | 4 | 4.962 | |
| 3 | 6 | −7.241 | |
| 4 | 8 | 28.997 | |
| 5 | 10 | 6.581 | |
| 6 | 12 | Infinity | |
| 7 | 14 | −3.936 | |

| Aspheric Surface Data | | | |
|---|---|---|---|
| | Second Surface | Third Surface | Fourth Surface | Fifth Surface |
| k | −9.439083E−01 | −1.909210E−01 | −1.381746E+01 | 0.000000E+00 |
| A4 | −1.379402E−02 | 2.780187E−02 | 2.815085E−02 | −7.557235E−02 |
| A6 | 4.083157E−02 | −1.242574E−01 | −7.590091E−02 | 1.845699E−01 |
| A8 | −1.294806E−01 | 9.045632E−02 | 2.327709E−02 | −2.197756E−01 |
| A10 | 1.897405E−01 | −2.172419E−02 | 4.635845E−02 | 1.307767E−01 |
| A12 | −1.680335E−01 | −1.239759E−02 | −4.054293E−02 | −1.913417E−02 |
| A14 | 8.203016E−02 | 1.415621E−02 | 1.623150E−02 | −1.443400E−02 |

TABLE 1-continued

Example 1
Unit mm
f = 4.89 ih = 3.93 Fno = 1.60 TTL = 5.53 ω(°) = 39.4

| | | | | |
|---|---|---|---|---|
| A16 | −2.096470E−02 | −5.307664E−03 | −3.999538E−03 | 6.762534E−03 |
| A18 | 2.158704E−03 | 7.116242E−04 | 4.582413E−04 | −8.615024E−04 |
| A20 | | | | |

| | Sixth Surface | Seventh Surface | Eighth Surface | Ninth Surface |
|---|---|---|---|---|
| k | 0.000000E+00 | 2.159540E−01 | 2.492904E−02 | −8.654383E−02 |
| A4 | −6.948357E−02 | −3.819584E−02 | −8.993828E−02 | −7.692711E−02 |
| A6 | 1.917854E−01 | 1.822452E−01 | 4.044096E−02 | 2.600825E−02 |
| A8 | −1.7582490E−01 | −3.666281E−01 | −7.370459E−02 | −5.483519E−02 |
| A10 | −2.461374E−02 | 5.617184E−01 | 9.418333E−02 | 5.480036E−02 |
| A12 | 1.488236E−01 | −6.125976E−01 | −7.075745E−02 | −2.851110E−02 |
| A14 | −1.038165E−01 | 4.232679E−00 | 2.468440E−02 | 5.842455E−03 |
| A16 | 3.110768E−02 | −1.610854E−01 | −3.000100E−03 | 0.000000E+00 |
| A18 | −3.549301E−03 | 2.587859E−02 | 0.000000E+00 | 0.000000E+00 |
| A20 | | | | |

| | Tenth Surface | Eleventh Surface | Twelfth Surface | Thirteenth Surface |
|---|---|---|---|---|
| k | 3.431773E+00 | −7.250828E+00 | 0.000000E+00 | 0.000000E+00 |
| A4 | −2.187381E−02 | −1.296901E−02 | 7.105337E−02 | 6.526861E−02 |
| A6 | 9.830792E−02 | 1.286181E−01 | −4.944210E−02 | −7.442498E−02 |
| A8 | −1.257053E−01 | −2.171890E−01 | −4.248131E−02 | 2.372703E−02 |
| A10 | 5.472806E−02 | 1.480038E−01 | 4.229265E−02 | −3.458269E−03 |
| A12 | −3.696223E−03 | −5.074691E−02 | −1.472433E−02 | 2.214094E−04 |
| A14 | −4.163554E−03 | 8.748515E−03 | 2.413440E−03 | −3.871386E−00 |
| A16 | 9.040915E−04 | −8.057718E−04 | −1.551382E−04 | 0.000000E+00 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | Fourteenth Surface | Fifteenth Surface |
|---|---|---|
| k | 4.167108E+00 | −8.349802E+00 |
| A4 | −1.379519E−01 | −7.796892E−02 |
| A6 | 2.354940E−02 | 2.400230E−02 |
| A8 | 5.624410E−03 | −5.296375E−03 |
| A10 | −2.531808E−03 | 8.982352E−04 |
| A12 | 3.729891E−04 | −1.145012E−04 |
| A14 | −2.544387E−05 | 8.672992E−06 |
| A16 | 6.758603E−07 | −2.703176E−07 |
| A18 | 0.000000E+00 | 0.000000E+00 |
| A20 | 0.000000E+00 | 0.000000E+00 |

The imaging lens in Example 1 satisfies conditional expressions (1) to (21) as shown in Table 12.

Figure 2:
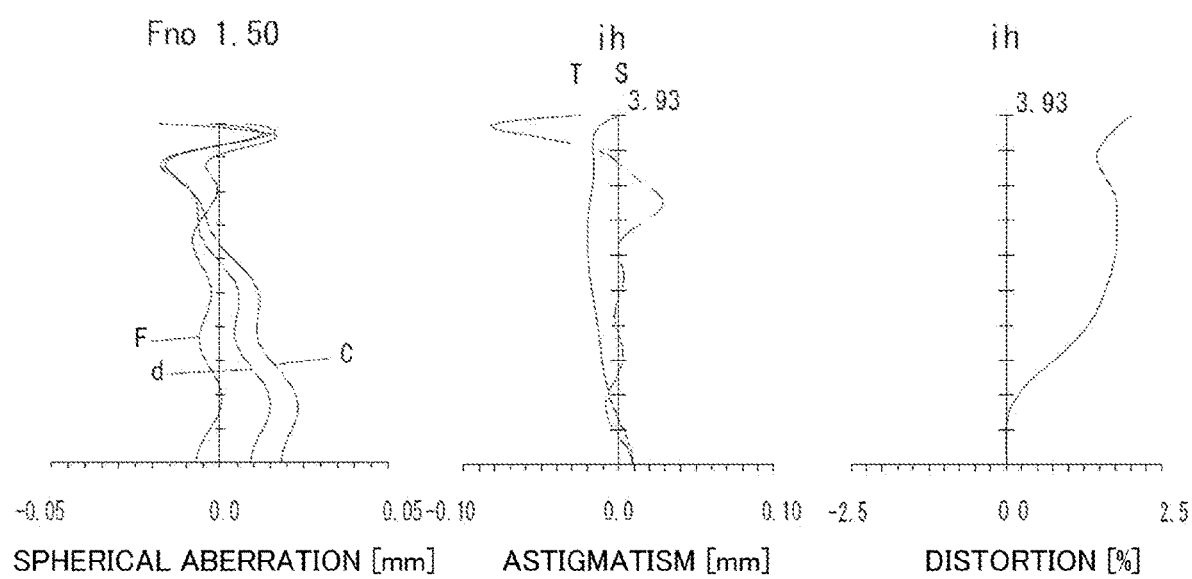
FIG. 2 shows spherical aberration, astigmatism, and distortion of the imaging lens in Example 1 according to the present invention.
Figure 3:
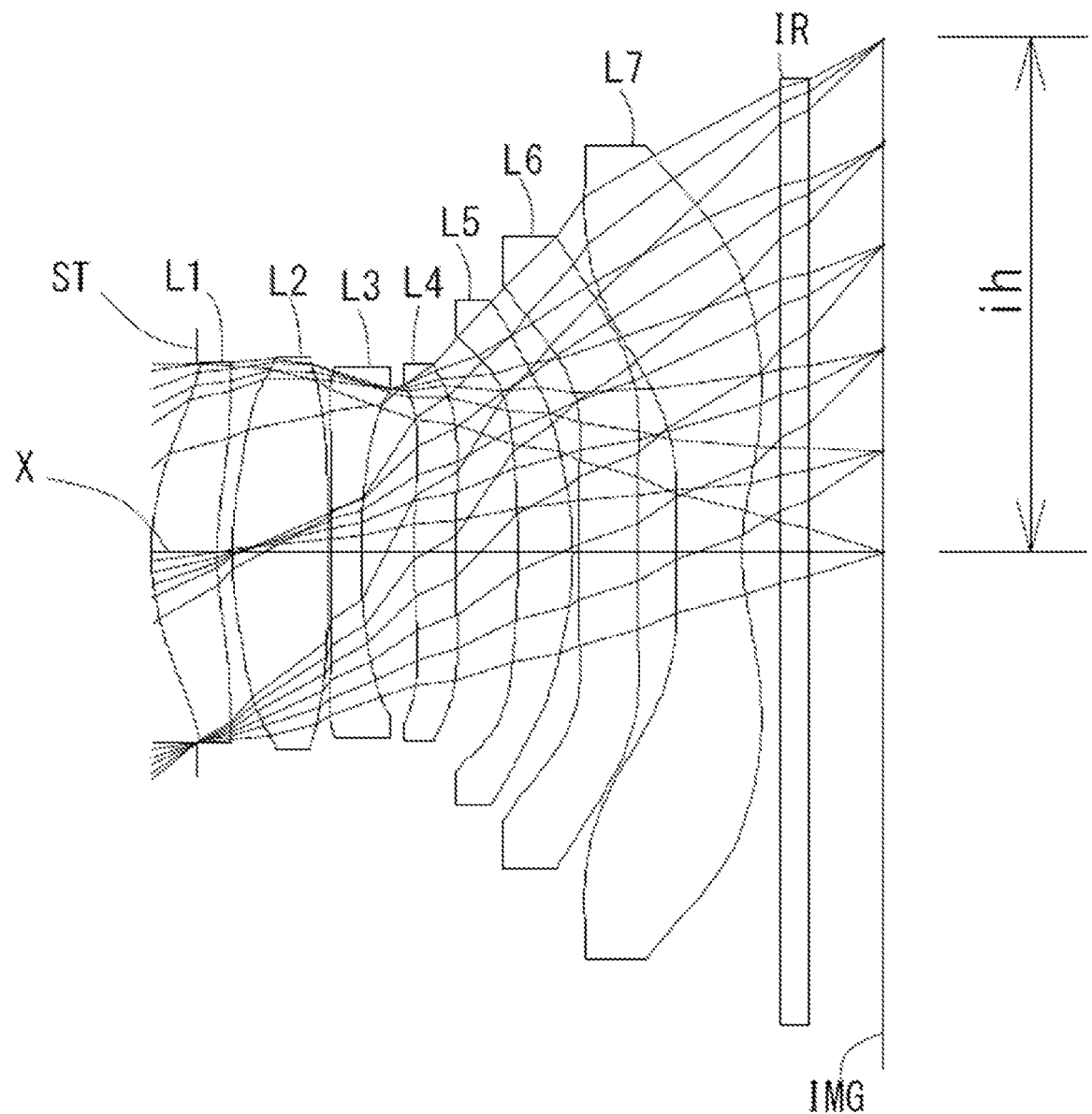
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10, 12, 14, 16, 18, 20 and 22). As shown in FIG. 2, each aberration is corrected excellently.

Example 2

The basic lens data is shown below in Table 2.

TABLE 2

Example 2
Unit mm
f = 4.70 ih = 3.93 Fno = 1.60 TTL = 5.53 ω(°) = 39.4

| Surface Data Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.3524 | | |
| 2* | 2.0674 | 0.5045 | 1.544 | 55.86 (vd1) |
| 3* | 2.9374 | 0.1130 | | |
| 4* | 2.8071 | 0.7373 | 1.544 | 55.86 (vd2) |
| 5* | −52.6640 | 0.0300 | | |
| 6* | −60.9003 | 0.2200 | 1.651 | 20.37 (vd3) |
| 7* | 5.0627 | 0.4047 | | |
| 8* | 6.2832 | 0.3179 | 1.661 | 20.37 (vd4) |
| 9* | 7.1213 | 0.4798 | | |

TABLE 2-continued

Example 2
Unit mm
f = 4.70 ih = 3.93 Fno = 1.60 TTL = 5.53 ω(°) = 39.4

| | | | | |
|---|---|---|---|---|
| 10* | −8.2952 | 0.4207 | 1.535 | 55.66 (vd5) |
| 11* | −2.4882 | 0.0418 | | |
| 12* | Infinity | 0.4500 | 1.661 | 20.37 (vd6) |
| 13* | Infinity | 0.3023 | | |
| 14* | 19.1625 | 0.5019 | 1.535 | 55.66 (vd7) |
| 15* | 1.8388 | 0.3000 | | |
| 18 | Infinity | 0.2100 | 1.517 | 64.20 |
| 19 | Infinity | 0.5703 | | |
| Image Plane | Infinity | | | |

Constituent Lens Data

| Lens | Start Surface | Focal Length | Composite Focal Length | |
|---|---|---|---|---|
| 1 | 2 | 10.648 | f67 | −3.842 |
| 2 | 4 | 4.919 | | |
| 3 | 6 | −7.055 | | |
| 4 | 8 | 28.985 | | |
| 5 | 10 | 6.486 | | |
| 6 | 12 | Infinity | | |
| 7 | 14 | −3.842 | | |

Aspheric Surface Data

| | Second Surface | Third Surface | Fourth Surface | Fifth Surface |
|---|---|---|---|---|
| k | −9.680707E−01 | −1.909178E−01 | −1.365274E+01 | 0.000000E+00 |
| A4 | −7.200435E−03 | 2.559394E−02 | 3.034061E−02 | −5.800254E−02 |
| A6 | 1.152181E−02 | −1.294839E−01 | −9.905954E−02 | 9.677413E−02 |
| A8 | −6.948781E−02 | 1.186074E−01 | 9.345235E−02 | −1.259774E−01 |
| A10 | 1.078279E−01 | −7.019291E−02 | −5.912249E−02 | 8.203502E−02 |
| A12 | −1.031794E−01 | 3.174137E−02 | 5.038425E−02 | −2.374724E−02 |
| A14 | 5.352817E−02 | −8.775957E−03 | −2.933541E−02 | 1.564758E−03 |
| A16 | −1.301757E−02 | 1.113891E−03 | 8.331981E−03 | 4.244397E−03 |
| A18 | 1.427651E−03 | −3.728743E−05 | −9.333881E−04 | −4.368367E−05 |
| A20 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | 2.105741E−01 | 3.161382E−02 | −9.231780E−02 |
| A4 | −5.618434E−02 | −2.817836E−02 | −9.763322E−02 | −8.011058E−02 |
| A6 | 1.498392E−01 | 1.356848E−01 | 6.960057E−02 | 3.539510E−02 |
| A8 | −1.565356E−01 | −2.451886E−01 | −1.286260E−01 | −6.895453E−02 |
| A10 | 4.369013E−02 | 3.568439E−01 | 1.523507E−01 | 6.544926E−02 |
| A12 | 3.195554E−02 | −3.977382E−01 | −1.061331E−01 | −3.211871E−02 |
| A14 | −2.455459E−02 | 2.888818E−01 | 3.671528E−02 | 6.270797E−03 |
| A16 | 5.564787E−03 | −1.156603E−01 | −5.008132E−03 | 0.000000E+00 |
| A18 | −3.112535E−04 | 1.964657E−02 | 0.000000E+00 | 0.000000E+00 |
| A20 | 0.000000E+00 | 0.000000E+00 | 0.000000E+00 | 0.000000E+00 |

| | Tenth Surface | Eleventh Surface | Twelfth Surface | Thirteenth Surface |
|---|---|---|---|---|
| k | 3.426384E+00 | −7.236685E+00 | 0.000000E+00 | 0.000000E+00 |
| A4 | −2.058506E−02 | −9.063188E−03 | 7.061786E−02 | 6.867640E−02 |
| A6 | 9.769552E−02 | 1.215270E−01 | −4.643905E−02 | −7.870465E−02 |
| A8 | −1.249977E−01 | −2.025406E−01 | −4.578530E−02 | 2.562325E−02 |
| A10 | 5.410417E−02 | 1.338222E−01 | 4.376388E−02 | −3.921524E−03 |
| A12 | −4.244888E−03 | −4.455736E−02 | −1.504480E−02 | 2.827886E−04 |
| A14 | −3.649255E−03 | 7.504716E−03 | 2.448059E−03 | −7.171536E−06 |
| A16 | 8.085585E−04 | −5.111007E−04 | −1.667757E−04 | 0.000000E+00 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | Fourteenth Surface | Fifteenth Surface |
|---|---|---|
| k | 4.150653E+00 | −8.334059E+00 |
| A4 | −1.389258E−01 | −8.095648E−02 |
| A6 | 2.701870E−02 | 2.585246E−02 |
| A8 | 3.247314E−03 | −5.743295E−03 |
| A10 | −1.828925E−03 | 9.456667E−04 |
| A12 | 2.687084E−04 | −1.152405E−04 |
| A14 | −1.776931E−05 | 8.421342E−06 |
| A16 | 4.526186E−07 | −2.558774E−07 |
| A18 | 0.000000E+00 | 0.000000E+00 |
| A20 | 0.000000E+00 | 0.000000E+00 |

The imaging lens in Example 2 satisfies conditional expressions (1) to (21) as shown in Table 12.

Figure 4:
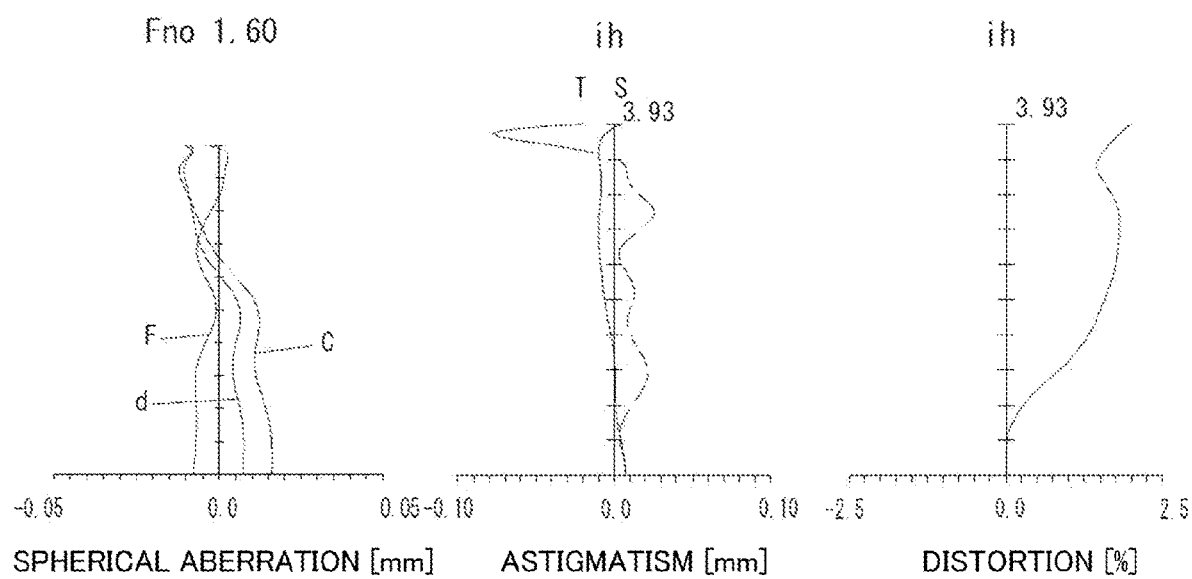
FIG. 4 shows spherical aberration, astigmatism, and distortion of the imaging lens in Example 2 according to the present invention.
Figure 5:
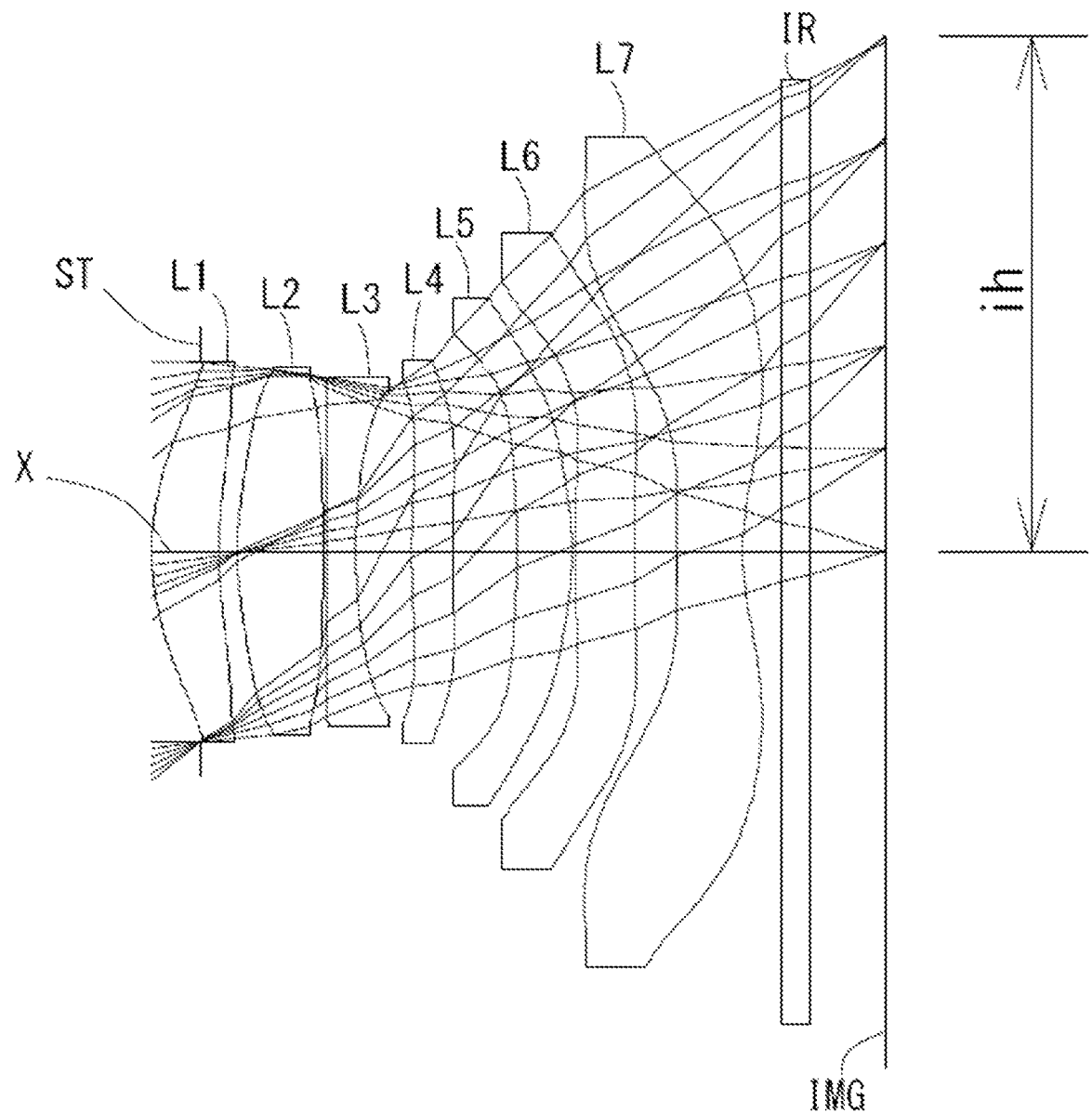
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 4.75 ih = 3.93 Fno = 1.60 TTL = 5.53 ω(°) = 39.1

Surface Data

| Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.3728 | | |
| 2* | 2.0695 | 0.5133 | 1.544 | 55.86 (vd1) |
| 3* | 3.3852 | 0.1434 | | |
| 4* | 3.0760 | 0.8514 | 1.544 | 55.86 (vd2) |
| 5* | −71.5347 | 0.0324 | | |
| 6* | 241.8758 | 0.2200 | 1.651 | 20.37 (vd3) |
| 7* | 4.5000 | 0.4268 | | |
| 8* | 5.6055 | 0.3116 | 1.661 | 20.37 (vd4) |
| 9* | 7.5550 | 0.4923 | | |
| 10* | −8.6513 | 0.4232 | 1.535 | 55.66 (vd5) |
| 11* | −2.6257 | 0.0316 | | |
| 12* | Infinity | 0.4500 | 1.661 | 20.37 (vd6) |
| 13* | Infinity | 0.3232 | | |
| 14* | 15.3104 | 0.5000 | 1.535 | 55.66 (vd7) |
| 15* | 1.83126 | 0.3000 | | |
| 18 | Infinity | 0.2100 | 1.517 | 64.20 |
| 19 | Infinity | 0.5760 | | |
| Image Plane | Infinity | | | |

Constituent Lens Data

| Lens | Start Surface | Focal Length | Composite Focal Length | |
|---|---|---|---|---|
| 1 | 2 | 8.600 | f67 | −3.895 |
| 2 | 4 | 5.435 | | |
| 3 | 6 | −6.942 | | |
| 4 | 8 | 30.910 | | |
| 5 | 10 | 6.881 | | |
| 6 | 12 | Infinity | | |
| 7 | 14 | −3.895 | | |

Aspheric Surface Data

| | Second Surface | Third Surface | Fourth Surface | Fifth Surface |
|---|---|---|---|---|
| k | −9.434789E−01 | −1.933237E−01 | −1.262368E+01 | 0.000000E+00 |
| A4 | −1.061387E−02 | 6.440275E−03 | 1.478432E−02 | −4.969867E−02 |
| A6 | 3.034698E−02 | −5.213866E−02 | −8.668202E−02 | −3.401601E−03 |
| A8 | −1.049240E−01 | 7.033553E−02 | 1.256776E−01 | 1.565348E−01 |
| A10 | 1.587821E−01 | −2.388811E−02 | −1.248753E−01 | −3.143928E−02 |
| A12 | −1.388508E−01 | −6.218423E−03 | 1.080923E−01 | 2.881146E−02 |
| A14 | 0.921510E−02 | 1.071256E−02 | −5.952147E−02 | −1.401130E−01 |
| A16 | −1.777868E−02 | −4.034217E−03 | 1.744470E−02 | 3.543170E−02 |
| A18 | 1.833891E−03 | 4.930967E−04 | −2.133891E−03 | −3.718537E−03 |
| A20 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | 2.241514E−01 | 8.952513E−01 | −1.014138E−01 |
| A4 | −4.509555E−02 | −3.000095E−02 | −9.933715E−02 | −8.893441E−02 |
| A6 | 6.456708E−02 | 1.479593E−01 | 8.758337E−02 | 7.161550E−02 |
| A8 | 8.334343E−02 | −2.879932E−01 | −2.094179E−01 | −1.651191E−01 |
| A10 | −2.923640E−01 | 4.403529E−01 | 3.020337E−01 | 1.956632E−01 |
| A12 | 2.933850E−01 | −4.930071E−01 | −2.447000E−01 | −1.262305E−01 |
| A14 | −1.395310E−01 | 3.545263E−01 | 1.017699E−01 | 4.197460E−02 |
| A16 | 3.236286E−02 | −1.407356E−01 | −1.692173E−03 | −5.479198E−03 |
| A18 | −2.884823E−03 | 2.364030E−02 | 0.000000E+00 | 0.000000E+00 |
| A20 | 0.000000E+00 | 0.000000E+00 | 0.000000E+00 | 0.000000E+00 |

TABLE 3-continued

Example 3
Unit mm
f = 4.75 ih = 3.93 Fno = 1.60 TTL = 5.53 ω(°) = 39.1

|  | Tenth Surface | Eleventh Surface | Twelfth Surface | Thirteenth Surface |
|---|---|---|---|---|
| k | 3.394563E+00 | −6.078759E+00 | 0.000000E+00 | 0.000000E+00 |
| A4 | −2.024279E−02 | 1.527193E−02 | 7.145853E−02 | 6.432511E−02 |
| A6 | 1.137753E−01 | 1.144877E−01 | −4.601340E−02 | −8.124917E−02 |
| A8 | −1.671283E−01 | −2.196053E−01 | −5.846636E−02 | 2.954763E−02 |
| A10 | 9.188784E−02 | 1.487496E−01 | 5.679771E−02 | −5.361880E−03 |
| A12 | −2.308781E−02 | −4.960324E−02 | −2.020163E−02 | 4.983830E−04 |
| A14 | 1.655025E−03 | 8.276478E−03 | 3.347438E−03 | −1.883239E−05 |
| A16 | 1.849862E−04 | −5.542113E−04 | −2.148888E−04 | 0.000000E+00 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

|  | Fourteenth Surface | Fifteenth Surface |
|---|---|---|
| k | 4.150653E+00 | −8.353354E+00 |
| A4 | −1.448534E−01 | −8.162864E−02 |
| A6 | 3.544736E−02 | 2.746317E−02 |
| A8 | −1.399683E−03 | −6.541535E−03 |
| A10 | −6.460925E−04 | 1.113813E−03 |
| A12 | 1.132658E−04 | −1.310477E−04 |
| A14 | −7.460089E−06 | 8.967279E−06 |
| A16 | 1.788885E−07 | −2.557784E−07 |
| A18 | 0.000000E+00 | 0.000000E+00 |
| A20 | 0.000000E+00 | 0.000000E+00 |

The imaging lens in Example 3 satisfies conditional expressions (1) to (21) as shown in Table 12.

Figure 6:
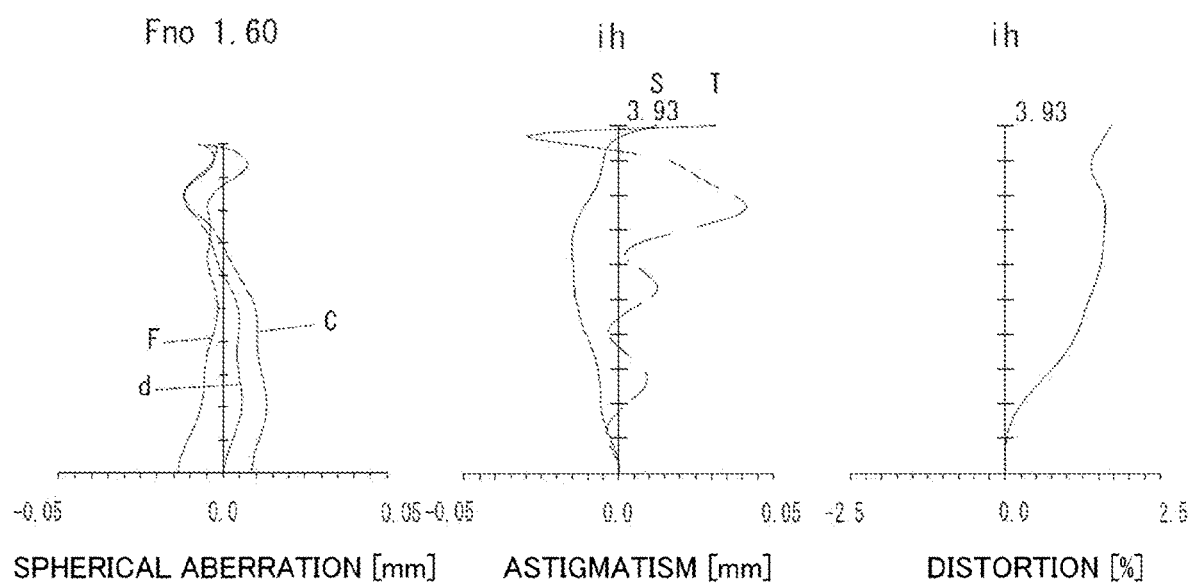
FIG. 6 shows spherical aberration, astigmatism, and distortion of the imaging lens in Example 3 according to the present invention.
Figure 7:
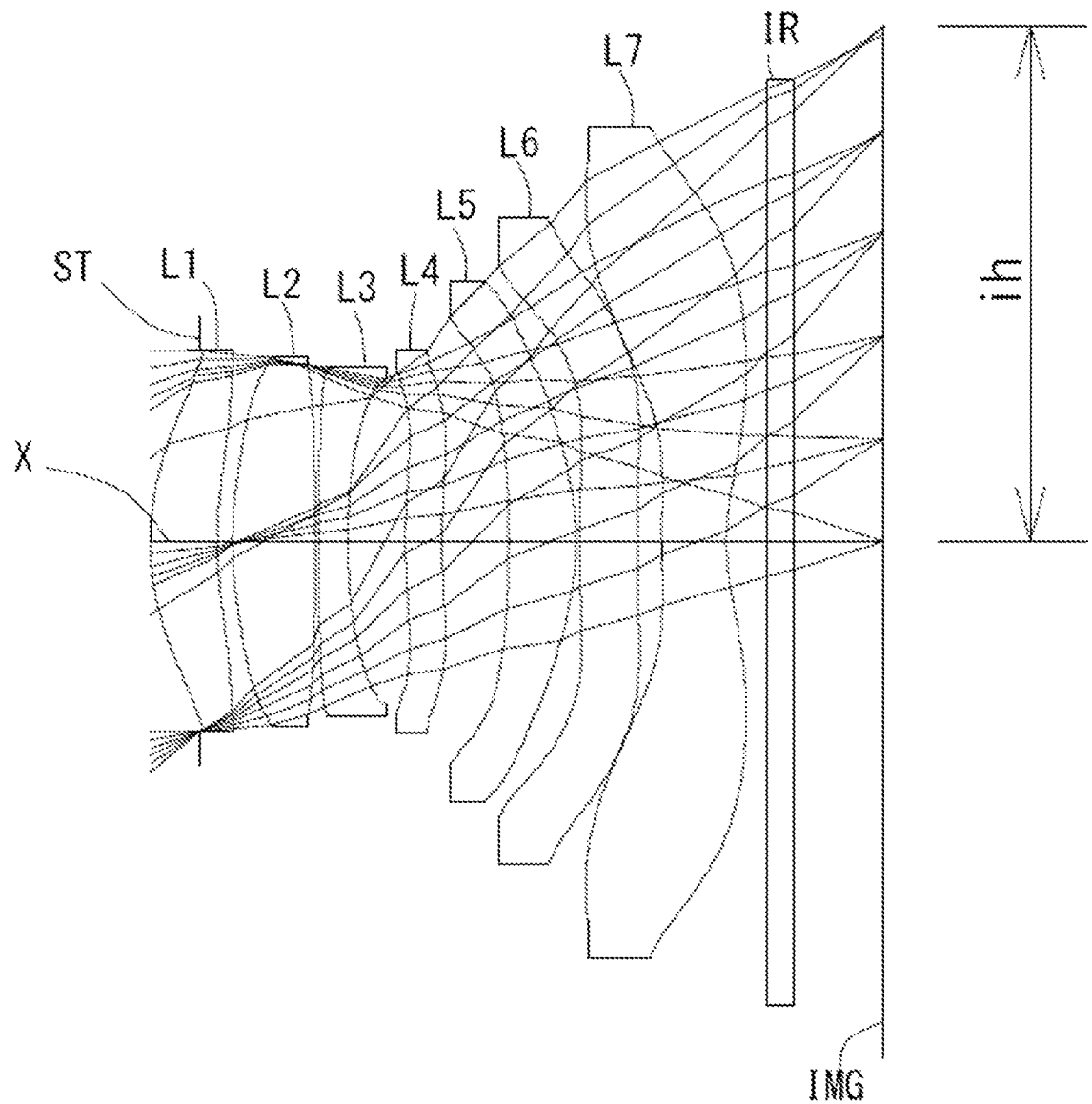
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 4.76 ih = 3.93 Fno = 1.60 TTL = 5.53 ω(°) = 39.1

| Surface Data Surface Number 1 | Curvature Radius r | Surface Distance d | Refractive Index Nd | Abbe Number vd |
|---|---|---|---|---|
| (Object) | Infinity | Infinity |  |  |
| 1 (Stop) | Infinity | −0.3802 |  |  |
| 2* | 2.0000 | 0.5126 | 1.544 | 55.86 (vd1) |
| 3* | 2.9904 | 0.1150 |  |  |
| 4* | 2.8617 | 0.6318 | 1.544 | 55.86 (vd2) |
| 5* | 30.8696 | 0.0300 |  |  |
| 6* | 18.5156 | 0.2200 | 1.671 | 19.48 (vd3) |
| 7* | 4.3394 | 0.4403 |  |  |
| 8* | 4.8506 | 0.2813 | 1.671 | 19.48 (vd4) |
| 9* | 5.0814 | 0.5173 |  |  |
| 10* | −6.0814 | 0.5065 | 1.535 | 55.66 (vd5) |
| 11* | −2.2018 | 0.0314 |  |  |
| 12* | Infinity | 0.4445 | 1.671 | 19.48 (vd6) |
| 13* | Infinity | 0.1848 |  |  |
| 14* | 8.2157 | 0.4875 | 1.535 | 55.66 (vd7) |
| 15* | 1.0007 | 0.3000 |  |  |
| 18 | Infinity | 0.2100 | 1.517 | 64.20 |
| 19 | Infinity | 0.6931 |  |  |
| Image Plane | Infinity |  |  |  |

| Constituent Lens Data | | | | |
|---|---|---|---|---|
| Lens | Start Surface | Focal Length | Composite Focal Length | |
| 1 | 2 | 9.383 | f67 | −3.815 |
| 2 | 4 | 5.749 |  |  |
| 3 | 6 | −8.495 |  |  |

TABLE 4-continued

Example 4
Unit mm
f = 4.76 ih = 3.93 Fno = 1.60 TTL = 5.53 ω(°) = 39.1

| 4 | 8  | 32.695   |
| 5 | 10 | 6.126    |
| 6 | 12 | Infinity |
| 7 | 14 | −3.815   |

Aspheric Surface Data

|     | Second Surface | Third Surface  | Fourth Surface | Fifth Surface  |
|-----|----------------|----------------|----------------|----------------|
| k   | −9.766550E−01  | −1.935882E+01  | −1.123660E+01  | 0.000000E+00   |
| A4  | −1.192969E−02  | 1.855313E−02   | 6.420155E−03   | −1.310087E−01  |
| A6  | 3.865475E−02   | −1.117583E−01  | −8.335213E−02  | 2.720859E−01   |
| A8  | −1.095738E−01  | 1.265825E−01   | 1.491710E−01   | −3.180566E−01  |
| A10 | 1.786653E−01   | −9.627340E−02  | −1.763402E−01  | 2.144920E−01   |
| A12 | −1.576923E−01  | 5.292456E−02   | 1.661290E−01   | −1.029006E−01  |
| A14 | 7.981613E−02   | −1.761968E−02  | −9.593470E−02  | 4.324201E−02   |
| A16 | −2.101411E−02  | 2.972028E−03   | 2.935732E−02   | −1.331421E−02  |
| A18 | 2.241676E−03   | −1.911757E−04  | −3.724897E−03  | 1.804316E−03   |
| A20 | 0.000000E+00   | 0.000000E+00   | 0.000000E+00   | 0.000000E+00   |

|     | Sixth Surface  | Seventh Surface | Eighth Surface | Ninth Surface  |
|-----|----------------|-----------------|----------------|----------------|
| k   | 0.000000E+00   | 9.708958E−01    | −5.845881E−01  | −1.723744E−01  |
| A4  | −1.126780E−01  | −2.887413E−02   | −1.008570E−01  | −9.305235E−02  |
| A6  | 2.994328E−01   | 1.493992E−01    | 1.122993E−01   | 1.140507E−01   |
| A8  | −3.353825E−01  | −2.873687E−01   | −3.018365E−01  | −2.756126E−01  |
| A10 | 1.909099E−01   | 4.406111E−01    | 4.373752E−01   | 3.332573E−01   |
| A12 | −7.522507E−02  | −4.926013E−01   | −3.569546E−01  | −2.251020E−01  |
| A14 | 3.914649E−02   | 3.546457E−01    | 1.514429E−01   | 7.967678E−02   |
| A16 | −1.697107E−02  | −1.407541E−01   | −2.545006E−02  | −1.118958E−02  |
| A18 | 2.943707E−03   | 2.369863E−02    | 0.000000E+00   | 0.000000E+00   |
| A20 | 0.000000E+00   | 0.000000E+00    | 0.000000E+00   | 0.000000E+00   |

|     | Tenth Surface  | Eleventh Surface | Twelfth Surface | Thirteenth Surface |
|-----|----------------|------------------|-----------------|--------------------|
| k   | 3.394546E+00   | −5.484798E+00    | 0.000000E+00    | 0.000000E+00       |
| A4  | −1.430894E−02  | −1.001347E−02    | 7.466269E−02    | 7.868812E−02       |
| A6  | 9.042992E−02   | 6.967656E−02     | −7.903925E−02   | −1.133632E−01      |
| A8  | −1.148358E−01  | −1.090545E−01    | −1.380549E−02   | 5.093735E−02       |
| A10 | 5.712912E−02   | 7.076642E−02     | 3.162618E−02    | −1.167611E−02      |
| A12 | −1.409223E−02  | −2.268863E−02    | −1.289857E−02   | 1.654466E−03       |
| A14 | 1.417493E−03   | 3.561679E−03     | 2.259601E−03    | −6.231025E−05      |
| A16 | 1.257430E−05   | −2.199000E−04    | −1.484958E−04   | 0.000000E+00       |
| A18 | 0.000000E+00   | 0.000000E+00     | 0.000000E+00    | 0.000000E+00       |
| A20 | 0.000000E+00   | 0.000000E+00     | 0.000000E+00    | 0.000000E+00       |

|     | Fourteenth Surface | Fifteenth Surface |
|-----|--------------------|-------------------|
| k   | 3.952089E+00       | −8.449574E+00     |
| A4  | −2.149192E−01      | −1.114224E−01     |
| A6  | 9.596561E−02       | 2.746317E−02      |
| A8  | −2.306028E−02      | −6.541535E−03     |
| A10 | 3.380942E−03       | 1.113813E−03      |
| A12 | −3.010188E−04      | −1.310477E−04     |
| A14 | 1.500206E−05       | 8.967279E−06      |
| A16 | −3.237248E−07      | −2.557784E−07     |
| A18 | 0.000000E+00       | 0.000000E+00      |
| A20 | 0.000000E+00       | 0.000000E+00      |

The imaging lens in Example 4 satisfies conditional expressions (1) to (21) as shown in Table 12.

Figure 8:
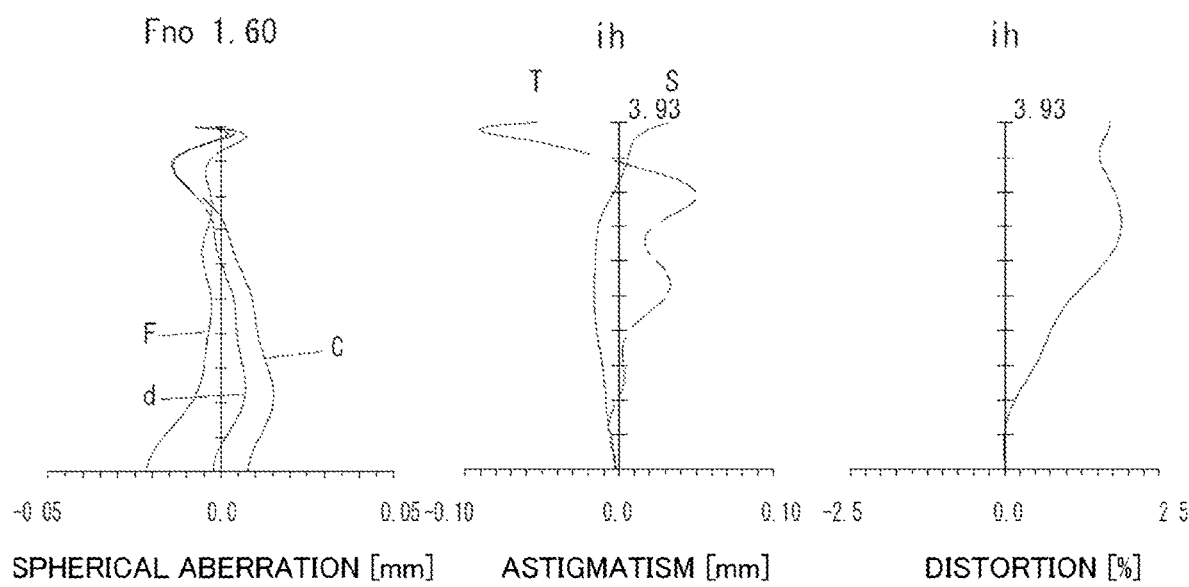
FIG. 8 shows spherical aberration, astigmatism, and distortion of the imaging lens in Example 4 according to the present invention.
Figure 9:
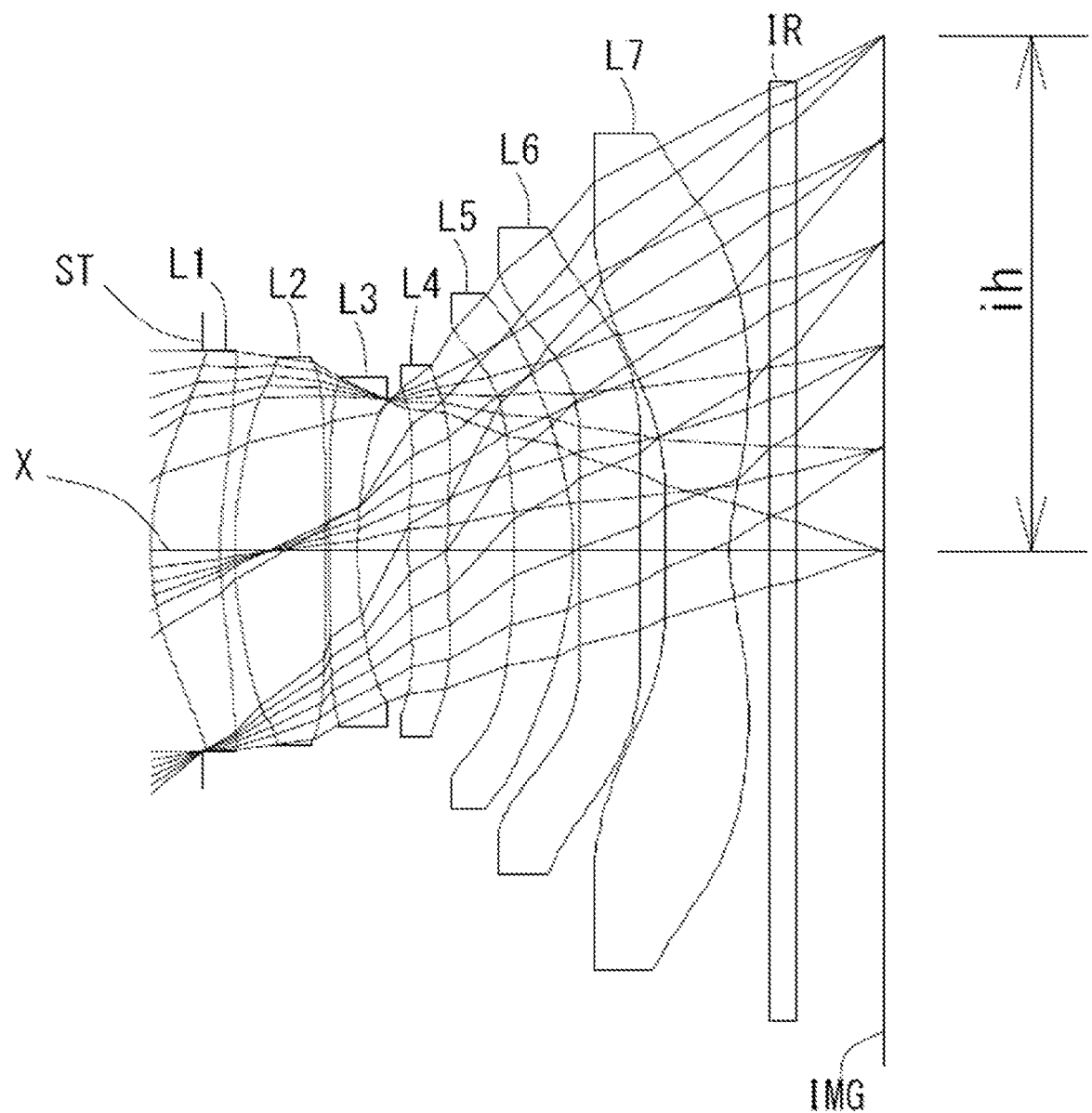
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 4.76 ih = 3.93 Fno = 1.60 TTL = 5.53 ω(°) = 39.0

Surface Data

| Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.3958 | | |
| 2* | 2.0544 | 0.5289 | 1.544 | 55.86 (vd1) |
| 3* | 3.1312 | 0.1106 | | |
| 4* | 2.7939 | 0.6978 | 1.544 | 55.86 (vd2) |
| 5* | 28.0234 | 0.0300 | | |
| 6* | 18.3850 | 0.2200 | 1.671 | 19.48 (vd3) |
| 7* | 4.1490 | 0.3872 | | |
| 8* | 5.2473 | 0.2966 | 1.671 | 19.48 (vd4) |
| 9* | 7.0627 | 0.5131 | | |
| 10* | −5.7185 | 0.4509 | 1.535 | 55.66 (vd5) |
| 11* | −2.2921 | 0.0470 | | |
| 12* | Infinity | 0.4646 | 1.671 | 19.48 (vd6) |
| 13* | Infinity | 0.1876 | | |
| 14* | 8.3938 | 0.4981 | 1.535 | 55.66 (vd7) |
| 15* | 1.6720 | 0.3000 | | |
| 18 | Infinity | 0.2100 | 1.517 | 64.20 |
| 19 | Infinity | 0.6637 | | |
| Image Plane | Infinity | | | |

Constituent Lens Data

| Lens | Start Surface | Focal Length | | Composite Focal Length |
|---|---|---|---|---|
| 1 | 2 | 9.356 | f67 | −4.008 |
| 2 | 4 | 5.846 | | |
| 3 | 6 | −8.031 | | |
| 4 | 8 | 28.533 | | |
| 5 | 10 | 6.839 | | |
| 6 | 12 | Infinity | | |
| 7 | 14 | −4.008 | | |

Aspheric Surface Data

| | Second Surface | Third Surface | Fourth Surface | Fifth Surface |
|---|---|---|---|---|
| k | −9.311809E−01 | −2.004452E+01 | −1.057112E+01 | 0.000000E+00 |
| A4 | −1.043291E−02 | 1.238831E−03 | −8.845780E−03 | −9.385266E−02 |
| A6 | 1.760371E−02 | −7.350352E−02 | 1.083043E−02 | 7.936406E−02 |
| A8 | −6.196434E−02 | 5.793895E−02 | −7.314596E−02 | 1.567054E−01 |
| A10 | 8.610647E−02 | 2.537194E−03 | 1.812188E−01 | −4.482735E−01 |
| A12 | −7.314912E−02 | −3.107975E−02 | −1.697033E−01 | 4.437367E−01 |
| A14 | 3.526153E−02 | 2.194658E−02 | 8.297180E−02 | −2.197256E−01 |
| A16 | −8.731976E−03 | −6.081762E−03 | −2.100862E−02 | 5.453989E−02 |
| A18 | 8.605784E−04 | 7.630071E−04 | 2.104444E−03 | −5.420723E−03 |
| A20 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | 1.050403E+00 | 8.684539E−01 | −1.760353E−01 |
| A4 | −8.045074E−02 | −3.033634E−02 | −1.023699E−01 | −8.975278E−02 |
| A6 | 1.303157E−01 | 1.518297E−01 | 1.188053E−01 | 1.089459E−01 |
| A8 | 9.301032E−02 | −2.867581E−01 | −3.353288E−01 | −2.698296E−01 |
| A10 | −4.181145E−01 | 4.400089E−01 | 5.239835E−01 | 3.376063E−01 |
| A12 | 4.374108E−01 | −4.932727E−01 | −4.618569E−01 | −2.373344E−01 |
| A14 | −2.119925E−01 | 3.551165E−01 | 2.113834E−01 | 8.748526E−02 |
| A16 | 4.863138E−02 | −1.410168E−01 | −3.880001E−02 | −1.277000E−02 |
| A18 | −4.036541E−03 | 2.389119E−02 | 0.000000E+00 | 0.000000E+00 |
| A20 | 0.000000E+00 | 0.000000E+00 | 0.000000E+00 | 0.000000E+00 |

TABLE 5-continued

Example 5
Unit mm
f = 4.76 ih = 3.93 Fno = 1.60 TTL = 5.53 ω(°) = 39.0

|   | Tenth Surface | Eleventh Surface | Twelfth Surface | Thirteenth Surface |
|---|---|---|---|---|
| k   | 2.431820E+00  | −5.502702E+00 | 0.000000E+00  | 0.000000E+00  |
| A4  | −1.177294E−03 | 6.563313E−04  | 5.603432E−02  | 4.167721E−02  |
| A6  | 6.921396E−02  | 4.120378E−02  | −7.511613E−02 | −6.755624E−02 |
| A8  | −1.023216E−01 | −7.059317E−02 | 9.001608E−03  | 2.652477E−02  |
| A10 | 6.011750E−02  | 4.427337E−02  | 7.188733E−03  | −5.476707E−03 |
| A12 | −2.090785E−02 | −1.314158E−02 | −3.052976E−02 | 6.147975E−03  |
| A14 | 4.062427E−03  | 1.817732E−03  | 5.098394E−04  | −2.885454E−05 |
| A16 | −3.075104E−04 | −9.138499E−05 | −3.304348E−05 | 0.000000E+00  |
| A18 | 0.000000E+00  | 0.000000E+00  | 0.000000E+00  | 0.000000E+00  |
| A20 | 0.000000E+00  | 0.000000E+00  | 0.000000E+00  | 0.000000E+00  |

|   | Fourteenth Surface | Fifteenth Surface |
|---|---|---|
| k   | 5.020961E+00  | −8.793187E+00 |
| A4  | −2.218884E−01 | −1.034744E−01 |
| A6  | 1.020760E−01  | 4.549483E−02  |
| A8  | −2.507987E−02 | −1.233487E−02 |
| A10 | 3.778083E−03  | 2.086271E−03  |
| A12 | −3.514387E−04 | −2.197373E−04 |
| A14 | 1.873152E−05  | 1.312010E−05  |
| A16 | −4.436525E−07 | −3.339278E−07 |
| A18 | 0.000000E+00  | 0.000000E+00  |
| A20 | 0.000000E+00  | 0.000000E+00  |

The imaging lens in Example 5 satisfies conditional expressions (1) to (21) as shown in Table 12.

Figure 10:
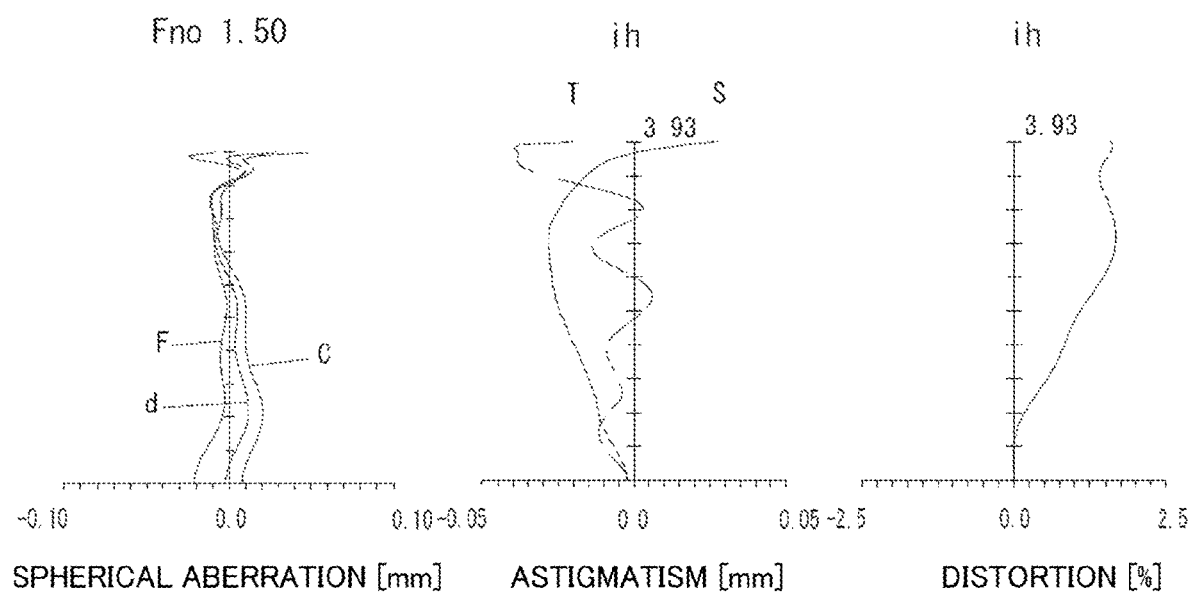
FIG. 10 shows spherical aberration, astigmatism, and distortion of the imaging lens in Example 5 according to the present invention.
Figure 11:
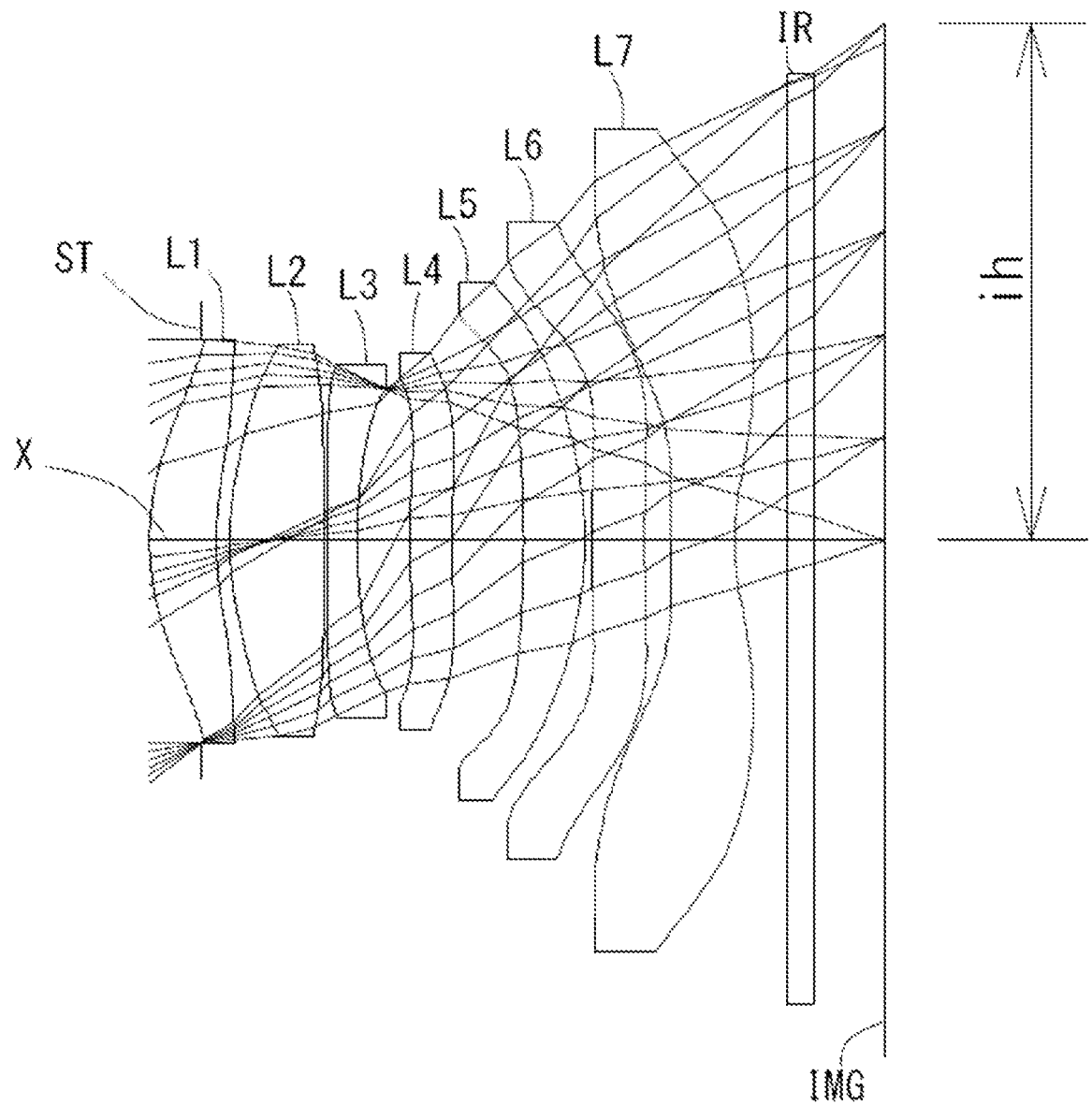
FIG. 11 is a schematic view showing an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6
Unit mm
f = 4.75 ih = 3.93 Fno = 1.60 TTL = 5.53 ω(°) = 39.1

| Surface Data | | | | |
|---|---|---|---|---|
| Surface Number 1 | Curvature Radius r | Surface Distance d | Refractive Index Nd | Abbe Number vd |
| (Object) | Infinity | Infinity | | |
| 1 (Stop) | Infinity | −0.3906 | | |
| 2* | 2.0490 | 0.5105 | 1.544 | 55.86 (vd1) |
| 3* | 2.6416 | 0.1004 | | |
| 4* | 2.3801 | 0.7135 | 1.544 | 55.86 (vd2) |
| 5* | 21.1520 | 0.0300 | | |
| 6* | 32.6634 | 0.2308 | 1.671 | 19.48 (vd3) |
| 7* | 4.6083 | 0.3984 | | |
| 8* | 5.8125 | 0.3218 | 1.671 | 19.48 (vd4) |
| 9* | 8.0153 | 0.5455 | | |
| 10* | −9.4848 | 0.4685 | 1.535 | 55.66 (vd5) |
| 11* | −2.5279 | 0.0542 | | |
| 12* | Infinity | 0.4000 | 1.671 | 19.48 (vd6) |
| 13* | Infinity | 0.2009 | | |
| 14* | 8.6270 | 0.4800 | 1.535 | 55.66 (vd7) |
| 15* | 1.6107 | 0.4000 | | |
| 18 | Infinity | 0.2100 | 1.517 | 64.20 |
| 19 | Infinity | 0.5402 | | |
| Image Plane | Infinity | | | |

TABLE 6-continued

Example 6
Unit mm
f = 4.75  ih = 3.93  Fno = 1.60  TTL = 5.53  ω(°) = 39.1

Constituent Lens Data

| Lens | Start Surface | Focal Length | | Composite Focal Length |
| --- | --- | --- | --- | --- |
| 1 | 2 | 12.873 | f67 | −3.794 |
| 2 | 4 | 4.862 | | |
| 3 | 6 | −8.018 | | |
| 4 | 8 | 29.756 | | |
| 5 | 10 | 6.296 | | |
| 6 | 12 | Infinity | | |
| 7 | 14 | −3.794 | | |

Aspheric Surface Data

| | Second Surface | Third Surface | Fourth Surface | Fifth Surface |
| --- | --- | --- | --- | --- |
| k | −9.750302E−01 | −1.955119E+01 | −9.736985E+00 | 0.000000E+00 |
| A4 | −2.384875E−03 | 5.697525E−03 | 4.000033E−02 | −1.050068E−01 |
| A6 | −2.065950E−02 | −2.015709E−01 | −1.304553E−01 | 2.132480E−01 |
| A8 | 4.381408E−02 | 2.800827E−01 | 2.389490E−01 | −3.595121E−01 |
| A10 | −8.079461E−02 | −3.309133E−01 | −4.013344E−01 | 5.325768E−01 |
| A12 | 8.544281E−02 | 3.095938E−01 | 5.002538E−01 | −6.176027E−01 |
| A14 | −5.830022E−02 | −1.954335E−01 | −3.794960E−01 | 4.841987E−01 |
| A16 | 2.471488E−02 | 7.638912E−02 | 1.680704E−01 | −2.048512E−01 |
| A18 | −5.775049E−03 | −1.663145E−02 | −4.036768E−02 | 4.795002E−02 |
| A20 | 5.540787E−04 | 1.536609E−03 | 4.065065E−03 | −4.576784E−03 |

| | Sixth Surface | Seventh Surface | Eighth Surface | Ninth Surface |
| --- | --- | --- | --- | --- |
| k | 0.000000E+00 | 2.273027E+00 | −4.690107E+00 | −2.407197E−01 |
| A4 | −1.057370E−01 | −2.733259E−02 | −9.354906E−02 | −8.544646E−02 |
| A6 | 3.016323E−01 | 1.122780E−01 | 7.987486E−02 | 7.610593E−02 |
| A8 | −4.453393E−01 | −2.307943E−02 | −1.991423E−01 | −1.771664E−01 |
| A10 | 5.455151E−01 | −3.366476E−01 | 2.919072E−01 | 2.114293E−01 |
| A12 | −5.646294E−01 | 8.311421E−01 | −2.495017E−01 | −1.421700E−01 |
| A14 | 3.963026E−01 | −1.071945E+00 | 1.101499E−01 | 4.956697E−02 |
| A16 | −1.592878E−01 | 7.931670E−01 | −1.930015E−02 | −6.751261E−03 |
| A18 | 3.141388E−02 | −3.156417E−01 | 0.000000E+00 | 0.000000E+00 |
| A20 | −2.072926E−03 | 5.257192E−02 | 0.000000E+00 | 0.000000E+00 |

| | Tenth Surface | Eleventh Surface | Twelfth Surface | Thirteenth Surface |
| --- | --- | --- | --- | --- |
| k | −4.037057E−01 | −5.467008E+00 | 0.000000E+00 | 0.000000E+00 |
| A4 | −2.394763E−02 | 5.686192E−02 | 1.430008E−01 | 1.115204E−01 |
| A6 | 1.070787E−01 | −8.094019E−02 | −2.353096E−01 | −1.753555E−01 |
| A8 | −1.629105E−01 | 4.578826E−02 | 1.358042E−01 | 9.700517E−02 |
| A10 | 1.138702E−01 | −1.657618E−02 | −4.709597E−02 | −3.033602E−02 |
| A12 | −4.569561E−02 | 4.600627E−03 | 9.999184E−03 | 5.536556E−03 |
| A14 | 9.465948E−03 | −9.132977E−04 | −1.154015E−03 | −5.349903E−04 |
| A16 | −7.429063E−04 | 8.345820E−05 | 5.472250E−05 | 2.128087E−05 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | | Fourteenth Surface | Fifteenth Surface |
| --- | --- | --- | --- |
| | k | 6.104675E+00 | −8.869353E+00 |
| | A4 | −2.268265E−01 | −1.155683E−01 |
| | A6 | 1.005901E−01 | 5.738910E−02 |
| | A8 | −2.222446E−02 | −1.713826E−02 |
| | A10 | 2.684135E−03 | 3.099353E−03 |
| | A12 | −1.630619E−04 | −3.349846E−04 |
| | A14 | 3.146502E−06 | 1.972444E−05 |
| | A16 | 6.130299E−08 | −4.820834E−07 |
| | A18 | 0.000000E+00 | 0.000000E+00 |
| | A20 | 0.000000E+00 | 0.000000E+00 |

The imaging lens in Example 6 satisfies conditional expressions (1) to (21) as shown in Table 12.

Figure 12:
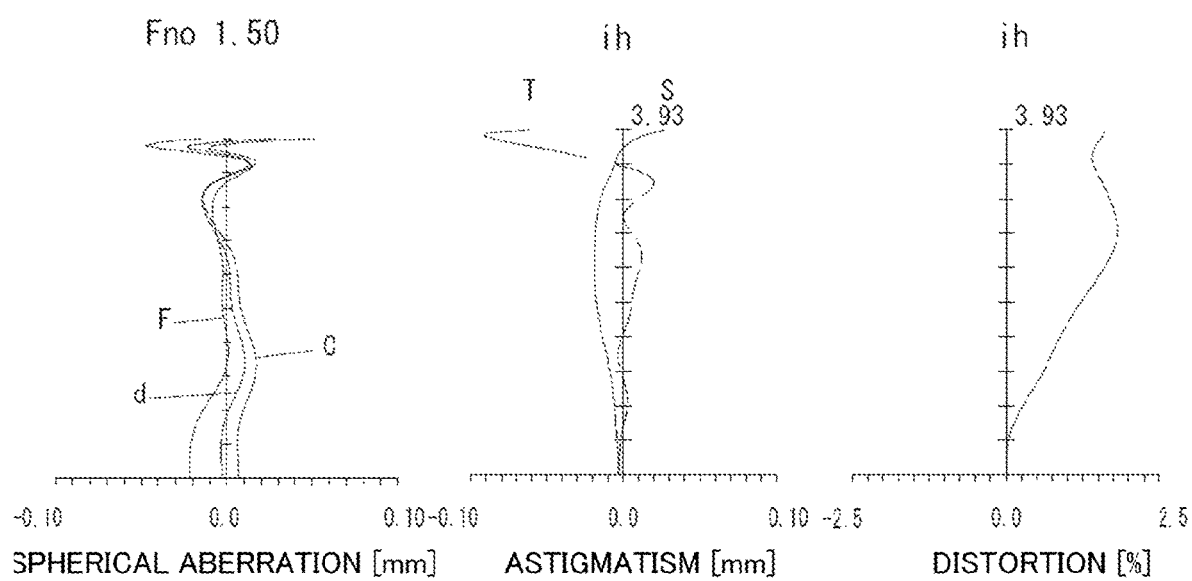
FIG. 12 shows spherical aberration, astigmatism, and distortion of the imaging lens in Example 6 according to the present invention.
Figure 13:
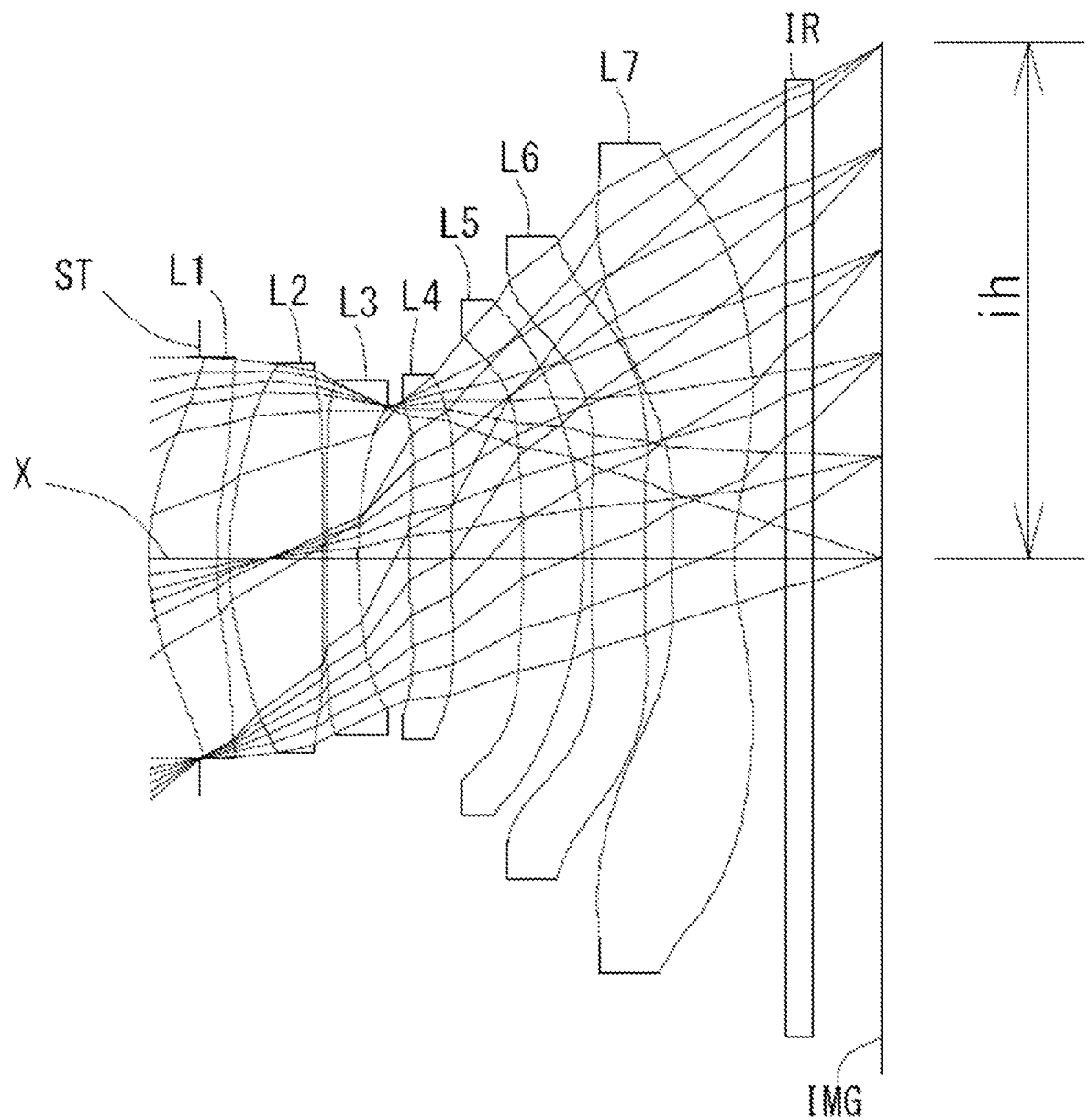
FIG. 13 is a schematic view showing an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example 7
Unit mm
f = 4.75 ih = 3.93 Fno = 1.60 TTL = 5.53 ω(°) = 39.1

Surface Data

| Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.3926 | | |
| 2* | 2.0542 | 0.5117 | 1.544 | 55.86 (vd1) |
| 3* | 2.6975 | 0.1002 | | |
| 4* | 2.4180 | 0.7107 | 1.544 | 55.86 (vd2) |
| 5* | 19.9746 | 0.0305 | | |
| 6* | 30.8660 | 0.2500 | 1.671 | 19.48 (vd3) |
| 7* | 4.5936 | 0.3898 | | |
| 8* | 5.6936 | 0.3220 | 1.671 | 19.48 (vd4) |
| 9* | 7.8172 | 0.5418 | | |
| 10* | −10.6935 | 0.4637 | 1.535 | 55.66 (vd5) |
| 11* | −2.6678 | 0.0623 | | |
| 12* | Infinity | 0.4088 | 1.671 | 20.37 (vd6) |
| 13* | Infinity | 0.2034 | | |
| 14* | 8.6408 | 0.4804 | 1.535 | 55.66 (vd7) |
| 15* | 1.6326 | 0.4000 | | |
| 18 | Infinity | 0.2100 | 1.517 | 64.20 |
| 19 | Infinity | 0.5204 | | |
| Image Plane | Infinity | | | |

Constituent Lens Data

| Lens | Start Surface | Focal Length | Composite Focal Length | |
|---|---|---|---|---|
| 1 | 2 | 12.360 | f67 | −3.856 |
| 2 | 4 | 4.976 | | |
| 3 | 6 | −8.069 | | |
| 4 | 8 | 29.765 | | |
| 5 | 10 | 6.515 | | |
| 6 | 12 | Infinity | | |
| 7 | 14 | −3.856 | | |

Aspheric Surface Data

| | Second Surface | Third Surface | Fourth Surface | Fifth Surface |
|---|---|---|---|---|
| k | −9.583361E−01 | −1.955119E+01 | −9.746335E+00 | 0.000000E+00 |
| A4 | −2.599316E−03 | 4.693722E−02 | 3.180955E−02 | −1.272386E−01 |
| A6 | −1.766263E−02 | −1.571992E−01 | −8.072227E−02 | 3.602637E−01 |
| A8 | 3.845096E−02 | 1.718491E−01 | 7.970342E−02 | −7.674024E−01 |
| A10 | −8.080038E−02 | −1.714782E−01 | −1.071444E−01 | 1.152087E+00 |
| A12 | 9.522731E−02 | 1.638573E−01 | 1.700883E−01 | −1.190408E+00 |
| A14 | −7.053368E−02 | −1.128146E−01 | −1.515291E−01 | 7.991689E−01 |
| A16 | 3.154440E−02 | 4.835225E−02 | 7.368491E−02 | −3.271606E−01 |
| A18 | −7.597685E−03 | −1.144787E−02 | −1.888570E−02 | 7.363495E−02 |
| A20 | 7.502824E−04 | −1.136998E−03 | 1.999237E−03 | −6.960701E−03 |

| | Sixth Surface | Seventh Surface | Eighth Surface | Ninth Surface |
|---|---|---|---|---|
| k | 0.000000E+00 | 2.273952E+00 | −4.690830E+00 | −2.409372E−01 |
| A4 | −1.188277E−01 | −2.438403E−02 | −9.235077E−02 | −7.731814E−02 |
| A6 | 4.088527E−01 | 9.878548E−02 | 5.884048E−02 | 3.452915E−02 |
| A8 | −7.703182E−01 | 1.001639E−02 | −1.312114E−01 | −8.776598E−02 |
| A10 | 1.069017E−01 | −3.655509E−01 | 1.854070E−01 | 1.078346E−01 |
| A12 | −1.079563E+00 | 8.075428E−01 | −1.602320E−01 | −7.482348E−02 |
| A14 | 7.246570E−01 | −9.481994E−01 | 7.205141E−02 | 2.661431E−02 |
| A16 | −2.953460E−01 | 6.479892E−01 | −1.283010E−02 | −3.564333E−03 |
| A18 | 6.520327E−02 | −2.428357E−01 | 0.000000E+00 | 0.000000E+00 |
| A20 | −5.889967E−03 | 3.870514E−02 | 0.000000E+00 | 0.000000E+00 |

| | Tenth Surface | Eleventh Surface | Twelfth Surface | Thirteenth Surface |
|---|---|---|---|---|
| k | −4.037058E−01 | −5.487714E+00 | 0.000000E+00 | 0.000000E+00 |
| A4 | −1.609636E−02 | 7.183422E−02 | 1.489146E−01 | 1.082738E−01 |
| A6 | 8.578322E−02 | −1.051033E−01 | −2.461887E−01 | −1.691604E−01 |
| A8 | −1.373650E−01 | 8.600288E−02 | 1.463393E−01 | 9.340813E−02 |
| A10 | 9.594070E−02 | −2.631338E−02 | −5.345886E−02 | −2.915270E−02 |

TABLE 7-continued

Example 7
Unit mm
f = 4.75 ih = 3.93 Fno = 1.60 TTL = 5.53 ω(°) = 39.1

| | | | | |
|---|---|---|---|---|
| A12 | −3.825074E−02 | 7.283295E−03 | 1.144320E−03 | 5.262950E−03 |
| A14 | 7.783989E−03 | −1.306053E−03 | −1.347320E−03 | −5.038725E−04 |
| A16 | −6.841415E−04 | 1.071700E−04 | 6.486474E−05 | 1.967430E−05 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | Fourteenth Surface | Fifteenth Surface |
|---|---|---|
| k | 6.105084E+00 | −8.872203E+00 |
| A4 | −2.323917E−01 | −1.179260E−01 |
| A6 | 1.043645E−01 | 5.881890E−02 |
| A8 | −2.520042E−02 | −1.713826E−02 |
| A10 | 3.369148E−03 | 3.210348E−03 |
| A12 | −2.525384E−04 | −3.488632E−04 |
| A14 | 9.467401E−06 | 2.060221E−05 |
| A16 | −1.258334E−07 | −5.035002E−07 |
| A18 | 0.000000E+00 | 0.000000E+00 |
| A20 | 0.000000E+00 | 0.000000E+00 |

The imaging lens in Example 7 satisfies conditional expressions (1) to (21) as shown in Table 12.

Figure 14:
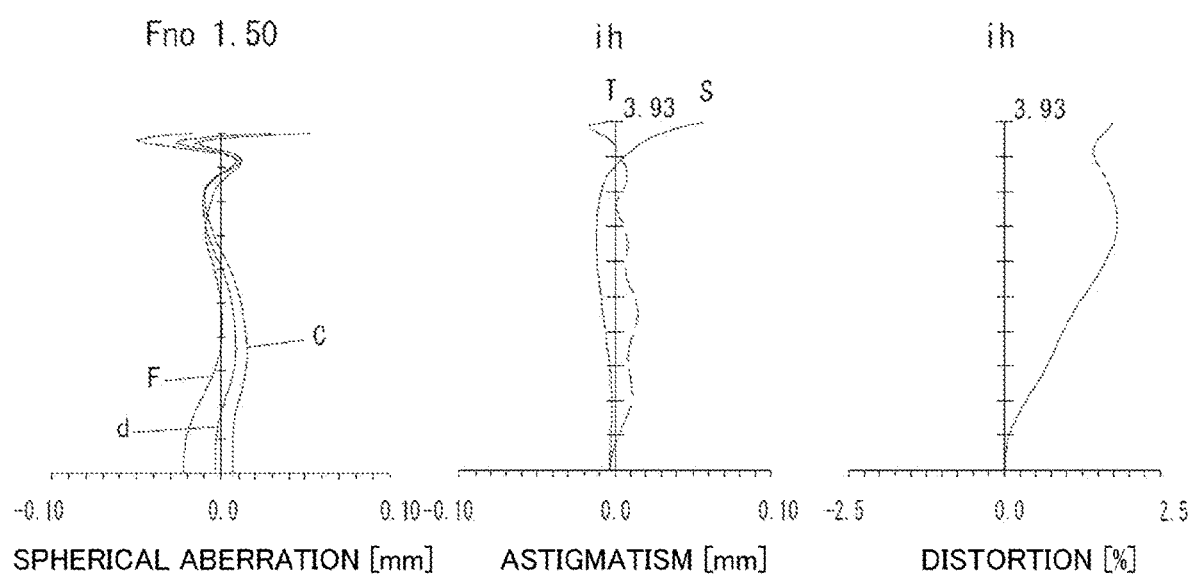
FIG. 14 shows spherical aberration, astigmatism, and distortion of the imaging lens in Example 7 according to the present invention.
Figure 15:
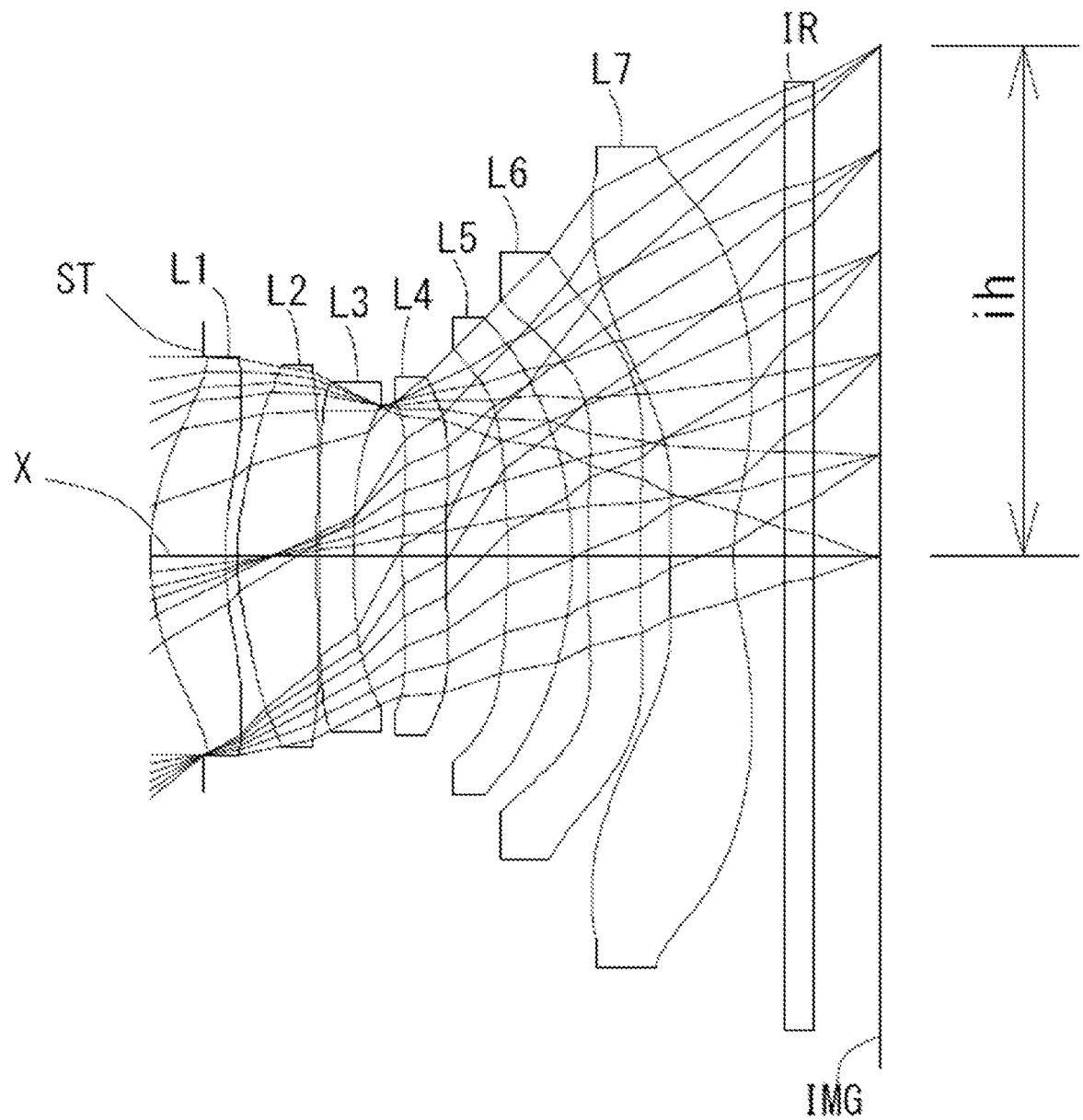
FIG. 15 is a schematic view showing an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

Example 8
Unit mm
f = 4.76 ih = 3.93 Fno = 1.60 TTL = 5.84 ω(°) = 39.0

| Surface Data Surface Number 1 | Curvature Radius r | Surface Distance d | Refractive Index Nd | Abbe Number νd |
|---|---|---|---|---|
| (Object) | Infinity | Infinity | | |
| 1 (Stop) | Infinity | −0.4107 | | |
| 2* | 1.9957 | 0.5750 | 1.544 | 55.86 (vd1) |
| 3* | 2.4000 | 0.0933 | | |
| 4* | 2.1235 | 0.6071 | 1.544 | 55.86 (vd2) |
| 5* | 7.9000 | 0.0300 | | |
| 6* | 27.9556 | 0.2500 | 1.671 | 19.48 (vd3) |
| 7* | 5.7272 | 0.3797 | | |
| 8* | 5.5830 | 0.3260 | 1.671 | 19.48 (vd4) |
| 9* | 6.5403 | 0.4791 | | |
| 10* | −7.7668 | 0.4962 | 1.535 | 55.66 (vd5) |
| 11* | −2.4301 | 0.1246 | | |
| 12* | Infinity | 0.4000 | 1.661 | 20.37 (vd6) |
| 13* | Infinity | 0.2318 | | |
| 14* | 8.1692 | 0.4800 | 1.535 | 55.66 (vd7) |
| 15* | 1.6738 | 0.4000 | | |
| 18 | Infinity | 0.2100 | 1.517 | 64.20 |
| 19 | Infinity | 0.5253 | | |
| Image Plane | Infinity | | | |

| Constituent Lens Data | | | | |
|---|---|---|---|---|
| Lens | Start Surface | Focal Length | Composite Focal Length | |
| 1 | 2 | 14.497 | f67 | −4.040 |
| 2 | 4 | 5.145 | | |
| 3 | 6 | −10.777 | | |
| 4 | 8 | 49.977 | | |
| 5 | 10 | 6.405 | | |
| 6 | 12 | Infinity | | |
| 7 | 14 | −4.040 | | |

TABLE 8-continued

Example 8
Unit mm
f = 4.76 ih = 3.93 Fno = 1.60 TTL = 5.84 ω(°) = 39.0

Aspheric Surface Data

|     | Second Surface | Third Surface | Fourth Surface | Fifth Surface |
|-----|----------------|---------------|----------------|---------------|
| k   | −8.545408E−01  | −1.968625E+01 | −1.144706E+01  | 0.000000E+00  |
| A4  | −9.733587E−04  | 6.835843E−02  | 6.747825E−02   | −1.291330E−01 |
| A6  | −1.745493E−02  | −1.739687E−01 | −9.054763E−02  | 4.214031E−02  |
| A8  | 5.751384E−02   | 8.239434E−02  | −3.813969E−02  | 5.830412E−02  |
| A10 | −1.292470E−01  | 5.540121E−01  | 8.752429E−02   | 2.749081E−01  |
| A12 | 1.577650E−01   | −9.353844E−02 | 5.871093E−02   | −8.099930E−01 |
| A14 | −1.164003E−01  | 5.609571E−02  | −1.536973E−01  | 8.461634E−01  |
| A16 | 5.053528E−02   | −1.769711E−02 | 1.062134E−01   | −4.405203E−01 |
| A18 | −1.177586E−02  | 2.767305E−03  | −3.347330E−02  | 1.153043E−01  |
| A20 | 1.131975E−03   | −1.536944E−04 | 4.109167E−03   | −1.211923E−02 |

|     | Sixth Surface | Seventh Surface | Eighth Surface | Ninth Surface |
|-----|---------------|-----------------|----------------|---------------|
| k   | 0.000000E+00  | 2.273931E+00    | −4.691611E+00  | −2.304155E−01 |
| A4  | −1.190912E−01 | −2.106420E−02   | −8.514209E−02  | −7.793831E−02 |
| A6  | 2.260608E−01  | 1.688709E−01    | −1.510136E−02  | 1.418414E−02  |
| A8  | −2.952742E−01 | −1.729938E−01   | 9.607961E−02   | −3.439294E−02 |
| A10 | 7.520757E−01  | 2.628245E−02    | −1.818491E−01  | 3.643008E−02  |
| A12 | −1.347761E+00 | 2.049459E−01    | 1.715818E−01   | −2.308148E−02 |
| A14 | 1.279626E+00  | −3.824796E−01   | −8.684838E−02  | 6.318187E−03  |
| A16 | −6.573125E−01 | 3.510008E−01    | 1.810031E−02   | −2.660419E−04 |
| A18 | 1.761156E−01  | −1.644881E−01   | 0.000000E+00   | 0.000000E+00  |
| A20 | −1.903887E−02 | 3.153673E−02    | 0.000000E+00   | 0.000000E+00  |

|     | Tenth Surface | Eleventh Surface | Twelfth Surface | Thirteenth Surface |
|-----|---------------|------------------|-----------------|--------------------|
| k   | −4.037067E−01 | −5.724413E+00    | 0.000000E+00    | 0.000000E+00       |
| A4  | 9.957518E−03  | 1.020600E−01     | 1.832165E−01    | 1.227451E−01       |
| A6  | 2.038801E−02  | −2.280711E−01    | −3.229402E−01   | −1.920293E−01      |
| A8  | −7.075564E−02 | 2.142919E−01     | 2.226415E−01    | 1.107138E−01       |
| A10 | 5.971340E−02  | −1.198699E−01    | −9.232555E−02   | −3.652889E−02      |
| A12 | −2.764974E−02 | 4.046513E−02     | 2.263471E−02    | 6.968088E−03       |
| A14 | 5.995413E−03  | −7.553717E−03    | −2.979894E−03   | −7.026578E−04      |
| A16 | −3.952858E−04 | 5.922711E−04     | 1.632166E−04    | 2.884144E−05       |
| A18 | 0.000000E+00  | 0.000000E+00     | 0.000000E+00    | 0.000000E+00       |
| A20 | 0.000000E+00  | 0.000000E+00     | 0.000000E+00    | 0.000000E+00       |

|     | Fourteenth Surface | Fifteenth Surface |
|-----|--------------------|-------------------|
| k   | 5.051585E+00       | −8.871487E+00     |
| A4  | −2.239277E−01      | −1.120040E−01     |
| A6  | 1.000785E−01       | 5.330926E−02      |
| A8  | −2.402395E−02      | −1.553288E−02     |
| A10 | 3.519721E−03       | 2.776633E−03      |
| A12 | −3.144935E−04      | −2.990374E−04     |
| A14 | 1.579445E−05       | 1.758290E−04      |
| A16 | −3.432192E−07      | −4.276717E−07     |
| A18 | 0.000000E+00       | 0.000000E+00      |
| A20 | 0.000000E+00       | 0.000000E+00      |

The imaging lens in Example 8 satisfies conditional expressions (1) to (21) as shown in Table 12.

Figure 16:
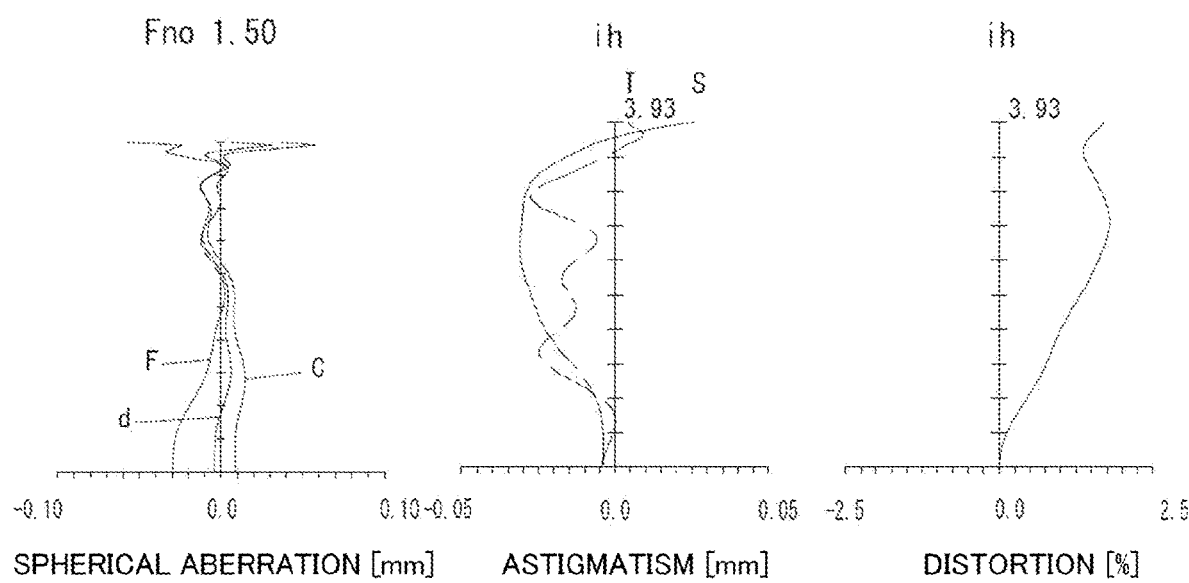
FIG. 16 shows spherical aberration, astigmatism, and distortion of the imaging lens in Example 8 according to the present invention.
Figure 17:
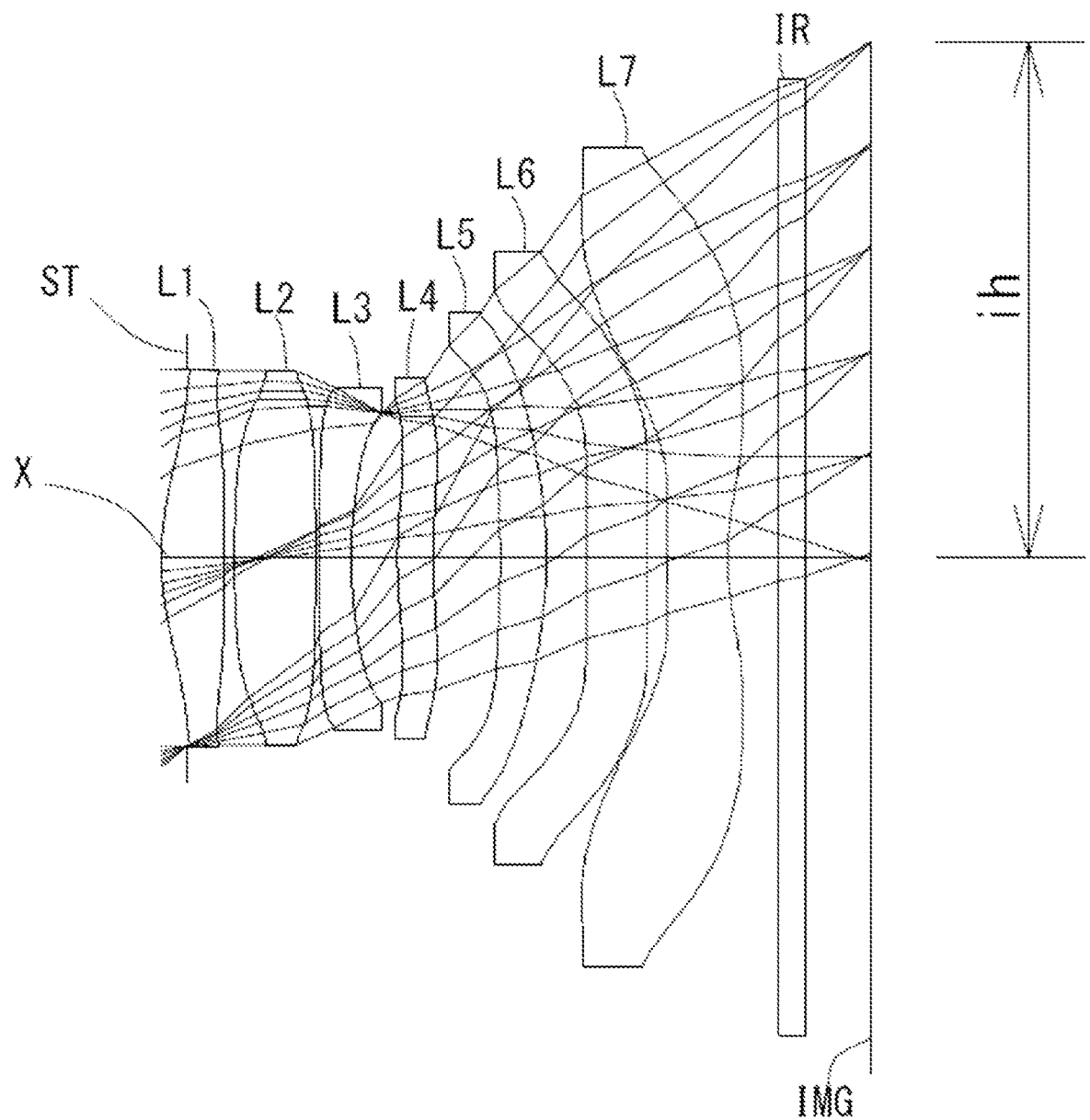
FIG. 17 is a schematic view showing an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

Example 9
Unit mm
f = 4.82 ih = 4.00 Fno = 1.50 TTL = 5.44 ω(°) = 39.2

Surface Data

| Surface Number | Curvature Radius r | Surface Distance d | Refractive Index Nd | Abbe Number νd |
|---|---|---|---|---|
| (Object) | Infinity | Infinity | | |
| 1 (Stop) | Infinity | −0.1918 | | |
| 2* | 2.4000 | 0.4869 | 1.544 | 55.86 (vd1) |
| 3* | 248.1196 | 0.0783 | | |
| 4* | 10.0000 | 0.6306 | 1.535 | 55.86 (vd2) |
| 5* | 76.4308 | 0.0300 | | |
| 6* | 12.3267 | 0.2500 | 1.671 | 19.48 (vd3) |
| 7* | 3.5817 | 0.3580 | | |
| 8* | 4.1212 | 0.2800 | 1.671 | 19.48 (vd4) |
| 9* | 5.5557 | 0.5192 | | |
| 10* | −7.8793 | 0.3592 | 1.535 | 55.66 (vd5) |
| 11* | −3.1276 | 0.3072 | | |
| 12* | Infinity | 0.4708 | 1.661 | 20.37 (vd6) |
| 13* | Infinity | 0.1630 | | |
| 14* | 7.5450 | 0.4658 | 1.535 | 55.66 (vd7) |
| 15* | 1.7002 | 0.4000 | | |
| 18 | Infinity | 0.2100 | 1.517 | 64.20 |
| 19 | Infinity | 0.4974 | | |
| Image Plane | Infinity | | | |

Constituent Lens Data

| Lens | Start Surface | Focal Length | | Composite Focal Length |
|---|---|---|---|---|
| 1 | 2 | 4.449 | f67 | −4.221 |
| 2 | 4 | 21.442 | | |
| 3 | 6 | −7.607 | | |
| 4 | 8 | 22.045 | | |
| 5 | 10 | 9.449 | | |
| 6 | 12 | Infinity | | |
| 7 | 14 | −4.221 | | |

Aspheric Surface Data

| | Second Surface | Third Surface | Fourth Surface | Fifth Surface |
|---|---|---|---|---|
| k | −2.583855E+00 | 9.207860E+01 | 2.976873E+01 | 0.000000E+00 |
| A4 | −1.124263E−02 | −5.510271E−02 | −1.294490E−02 | −1.161040E−01 |
| A6 | −4.236373E−02 | 3.461660E−02 | 1.150828E−02 | 3.509570E−01 |
| A8 | 7.091385E−02 | −8.595310E−02 | −2.432615E−01 | −6.178434E−01 |
| A10 | −1.554732E−01 | 1.767767E−01 | 4.354209E−01 | 6.346235E−01 |
| A12 | 1.793993E−01 | −1.956470E−01 | −4.490906E−01 | −4.605324E−01 |
| A14 | −1.119303E−01 | 1.292403E−01 | 2.654347E−01 | 2.550766E−01 |
| A16 | 4.007139E−02 | −5.088104E−02 | −8.998786E−02 | −1.004878E−01 |
| A18 | −7.846113E−03 | 1.104263E−02 | 1.590791E−02 | 2.368498E−02 |
| A20 | 6.548243E−04 | −1.022863E−03 | −1.083764E−03 | −2.386171E−03 |

| | Sixth Surface | Seventh Surface | Eighth Surface | Ninth Surface |
|---|---|---|---|---|
| k | 0.000000E+00 | 1.80826E+00 | −4.704160E+00 | −2.166368E−01 |
| A4 | −1.683836E−01 | −9.878505E−02 | −9.553706E−02 | −7.947691E−02 |
| A6 | 4.967508E−01 | 2.288917E−01 | 5.268821E−02 | 5.522778E−02 |
| A8 | −7.909182E−01 | −9.626816E−02 | −1.484654E−01 | −1.778321E−01 |
| A10 | 7.762338E−01 | −6.986643E−01 | 2.477821E−01 | 2.568718E−01 |
| A12 | −4.862202E+00 | 2.139476E+00 | −2.386048E−01 | −1.995825E−01 |
| A14 | 1.887143E−01 | −2.999994E+00 | 1.199006E−01 | 8.056291E−02 |
| A16 | −3.220088E−02 | 2.320800E+00 | −2.400013E−02 | −1.286567E−02 |
| A18 | −3.918024E−03 | −9.520785E−01 | 0.000000E+00 | 0.000000E+00 |
| A20 | 1.820568E−03 | 1.623987E−01 | 0.000000E+00 | 0.000000E+00 |

| | Tenth Surface | Eleventh Surface | Twelfth Surface | Thirteenth Surface |
|---|---|---|---|---|
| k | −3.939838E−01 | −4.913670E+00 | 0.000000E+00 | 0.000000E+00 |
| A4 | 6.140031E−02 | 9.095891E−02 | 8.305658E−02 | 7.012118E−02 |
| A6 | −6.536510E−02 | −1.457719E−01 | −1.736701E−01 | −1.404051E−01 |
| A8 | 3.621620E−02 | 1.689026E−01 | 9.295189E−02 | 7.191806E−02 |
| A10 | −2.004392E−02 | −8.415179E−02 | −2.489045E−02 | −1.814775E−02 |

TABLE 9-continued

Example 9
Unit mm
f = 4.82 ih = 4.00 Fno = 1.50 TTL = 5.44 ω(°) = 39.2

| A12 | 4.601320E−03 | 2.998462E−02 | 2.982269E−03 | 2.291461E−03 |
|---|---|---|---|---|
| A14 | −1.665772E−04 | −5.678888E−03 | 1.283530E−05 | −1.174221E−04 |
| A16 | 0.000000E+00 | 4.377052E−04 | −2.243099E−05 | 4.863113E−07 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | | Fourteenth Surface | Fifteenth Surface |
|---|---|---|---|
| | k | 4.270619E+00 | −8.757146E+00 |
| | A4 | −2.554846E−01 | −1.369948E−01 |
| | A6 | 1.215077E−01 | 7.374270E−02 |
| | A8 | −3.149555E−02 | −2.232579E−02 |
| | A10 | 5.015044E−03 | 3.898596E−03 |
| | A12 | −4.878929E−04 | −3.957048E−04 |
| | A14 | 2.663770E−05 | 2.109251E−05 |
| | A16 | −6.269945E−07 | −4.945457E−07 |
| | A18 | 0.000000E+00 | 0.000000E+00 |
| | A20 | 0.000000E+00 | 0.000000E+00 |

The imaging lens in Example 9 satisfies conditional expressions (1) to (21) as shown in Table 12.

Figure 18:
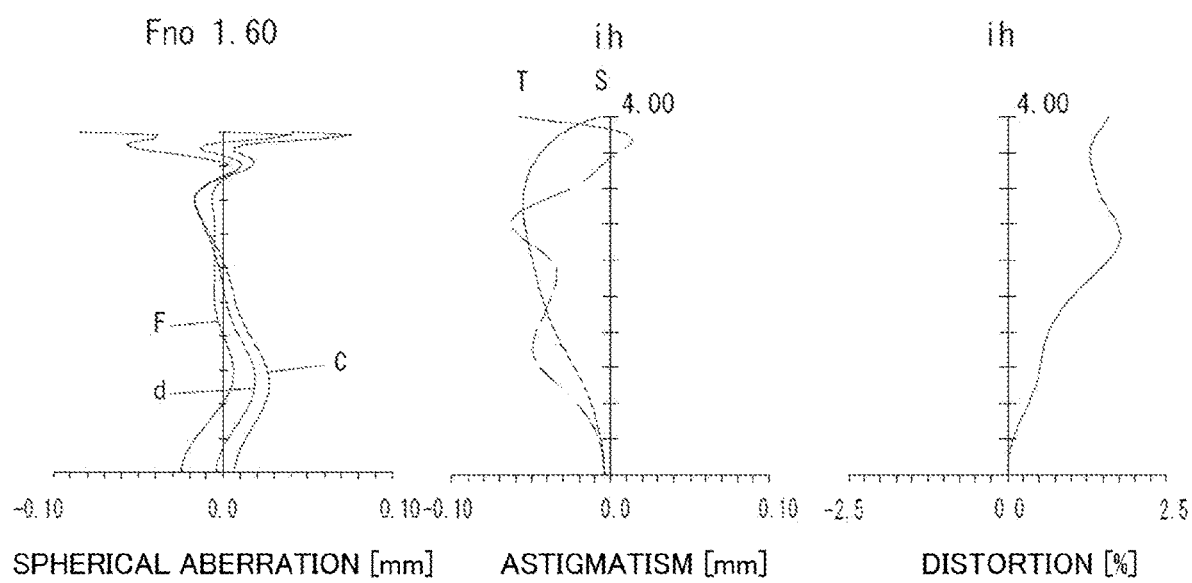
FIG. 18 shows spherical aberration, astigmatism, and distortion of the imaging lens in Example 9 according to the present invention.
Figure 19:
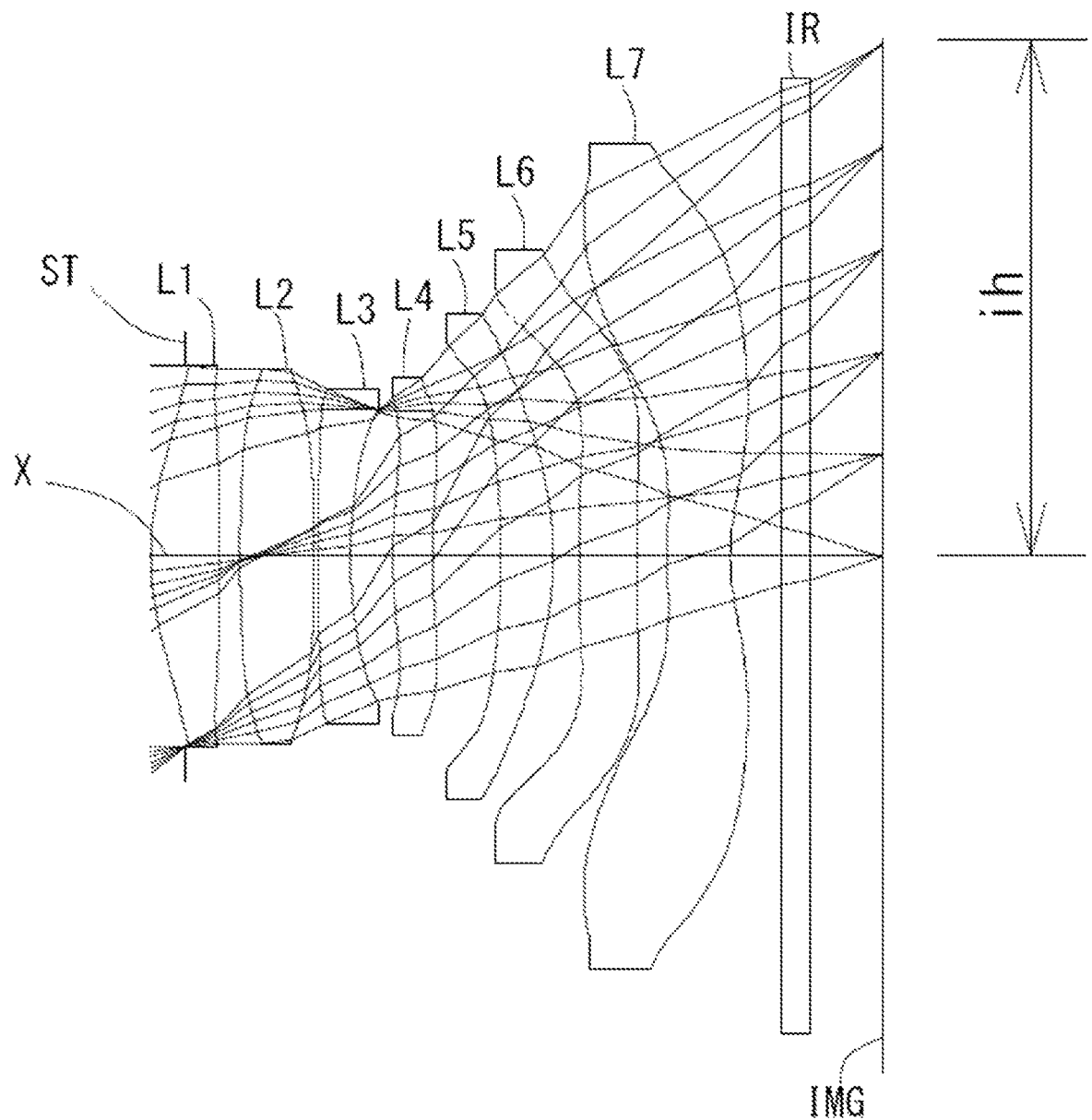
FIG. 19 is a schematic view showing an imaging lens in Example 10 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example 10
Unit mm
f = 4.76 ih = 3.93 Fno = 1.60 TTL = 5.84 ω(°) = 39.0

| Surface Data Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.2611 | | |
| 2* | 2.4000 | 0.5160 | 1.544 | 55.86 (vd1) |
| 3* | 20.9819 | 0.1653 | | |
| 4* | 10.0000 | 0.5684 | 1.535 | 55.86 (vd2) |
| 5* | −45.9191 | 0.0300 | | |
| 6* | 15.5211 | 0.2500 | 1.671 | 19.48 (vd3) |
| 7* | 3.8649 | 0.3241 | | |
| 8* | 3.8762 | 0.3024 | 1.671 | 19.48 (vd4) |
| 9* | 4.7281 | 0.5248 | | |
| 10* | −5.8900 | 0.4027 | 1.535 | 55.66 (vd5) |
| 11* | −2.2758 | 0.1964 | | |
| 12* | Infinity | 0.4407 | 1.661 | 20.37 (vd6) |
| 13* | Infinity | 0.2370 | | |
| 14* | 7.0902 | 0.4800 | 1.535 | 55.66 (vd7) |
| 15* | 1.6087 | 0.4000 | | |
| 18 | Infinity | 0.2100 | 1.517 | 64.20 |
| 19 | Infinity | 0.5587 | | |
| Image Plane | Infinity | | | |

| Constituent Lens Data | | | | |
|---|---|---|---|---|
| Lens | Start Surface | Focal Length | Composite Focal Length | |
| 1 | 2 | 4.931 | f67 | −4.013 |
| 2 | 4 | 15.409 | | |
| 3 | 6 | −7.732 | | |
| 4 | 8 | 28.042 | | |
| 5 | 10 | 6.679 | | |

TABLE 10-continued

Example 10
Unit mm
f = 4.76 ih = 3.93 Fno = 1.60 TTL = 5.84 ω(°) = 39.0

| 6 | 12 | Infinity |
| 7 | 14 | −4.013 |

Aspheric Surface Data

|    | Second Surface | Third Surface | Fourth Surface | Fifth Surface |
| --- | --- | --- | --- | --- |
| k   | −1.578042E+00 | −1.968015E+01 | 2.827835E+01 | 0.000000E+00 |
| A4  | −5.048880E−03 | −4.851684E−02 | −4.497292E−02 | −1.110752E−01 |
| A6  | −4.957920E−02 | −2.178744E−02 | 6.220331E−02 | 3.464784E−01 |
| A8  | 1.204400E−01 | 1.213445E−01 | −5.470239E−02 | −8.951157E−01 |
| A10 | −2.359106E−01 | −2.416859E−01 | 7.706774E−02 | 1.370799E+00 |
| A12 | 2.749849E−01 | 3.024030E−01 | −5.987169E−02 | −1.324690E+00 |
| A14 | −1.983443E−01 | −2.357433E−01 | 1.569438E−02 | 8.190226E−01 |
| A16 | 8.785350E−02 | 1.114619E−01 | 5.382041E−03 | −3.128946E−01 |
| A18 | −2.164841E−02 | −2.897194E−02 | −4.128048E−03 | 8.698071E−02 |
| A20 | 2.249495E−03 | 3.151803E−03 | 6.930637E−04 | −8.126349E−03 |

|    | Sixth Surface | Seventh Surface | Eighth Surface | Ninth Surface |
| --- | --- | --- | --- | --- |
| k   | 0.000000E+00 | 2.280547E+00 | −4.684959E+00 | −2.530434E−01 |
| A4  | −7.341818E−02 | −1.062718E−02 | −8.411389E−02 | −7.882449E−02 |
| A6  | 3.670389E−01 | 3.765614E−02 | −6.588636E−03 | 2.985282E−03 |
| A8  | −1.010824E+00 | 1.329634E−01 | 7.047188E−02 | −8.684272E−03 |
| A10 | 1.637073E+00 | −7.108789E−01 | −1.421988E−01 | 1.181031E−03 |
| A12 | −1.713845E+00 | 1.447525E+00 | 1.370050E−01 | 4.388255E−03 |
| A14 | 1.187773E−01 | −1.609771E+00 | −7.078239E−02 | −5.506090E−03 |
| A16 | −5.207202E−01 | 1.033108E+00 | 1.560075E−02 | 2.033324E−03 |
| A18 | 1.297957E−01 | −3.582093E−01 | 0.000000E+00 | 0.000000E+00 |
| A20 | −1.395882E−02 | 5.206324E−02 | 0.000000E+00 | 0.000000E+00 |

|    | Tenth Surface | Eleventh Surface | Twelfth Surface | Thirteenth Surface |
| --- | --- | --- | --- | --- |
| k   | −4.006618E−01 | −5.406155E+00 | 0.000000E+00 | 0.000000E+00 |
| A4  | 3.913418E−02 | 1.092597E−01 | 1.920929E−01 | 1.289719E−01 |
| A6  | −3.598701E−02 | −2.192776E−01 | −3.215343E−01 | −1.941981E−01 |
| A8  | −1.910302E−00 | 1.831254E−01 | 2.187639E−01 | 1.108825E−01 |
| A10 | 1.561088E−02 | −8.347364E−02 | −9.116332E−02 | −3.711419E−02 |
| A12 | −1.027008E−02 | 2.263454E−02 | 2.217519E−02 | 7.253192E−03 |
| A14 | 1.960846E−03 | −3.564884E−03 | −2.793783E−03 | −7.507837E−04 |
| A16 | 0.000000E+00 | 2.532212E−04 | 1.398958E−04 | 3.165895E−05 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

|    | Fourteenth Surface | Fifteenth Surface |
| --- | --- | --- |
| k   | 4.224566E+00 | −8.836801E+00 |
| A4  | −2.600616E−01 | −1.245910E−01 |
| A6  | 1.221803E−01 | 6.024715E−02 |
| A8  | −3.143571E−02 | −1.714897E−02 |
| A10 | 5.036676E−03 | 2.981166E−03 |
| A12 | −5.009306E−04 | −3.145799E−04 |
| A14 | 2.833720E−05 | 1.829812E−05 |
| A16 | −6.988488E−07 | −4.436602E−07 |
| A18 | 0.000000E+00 | 0.000000E+00 |
| A20 | 0.000000E+00 | 0.000000E+00 |

The imaging lens in Example 10 satisfies conditional expressions (1) to (21) as shown in Table 12.

Figure 20:
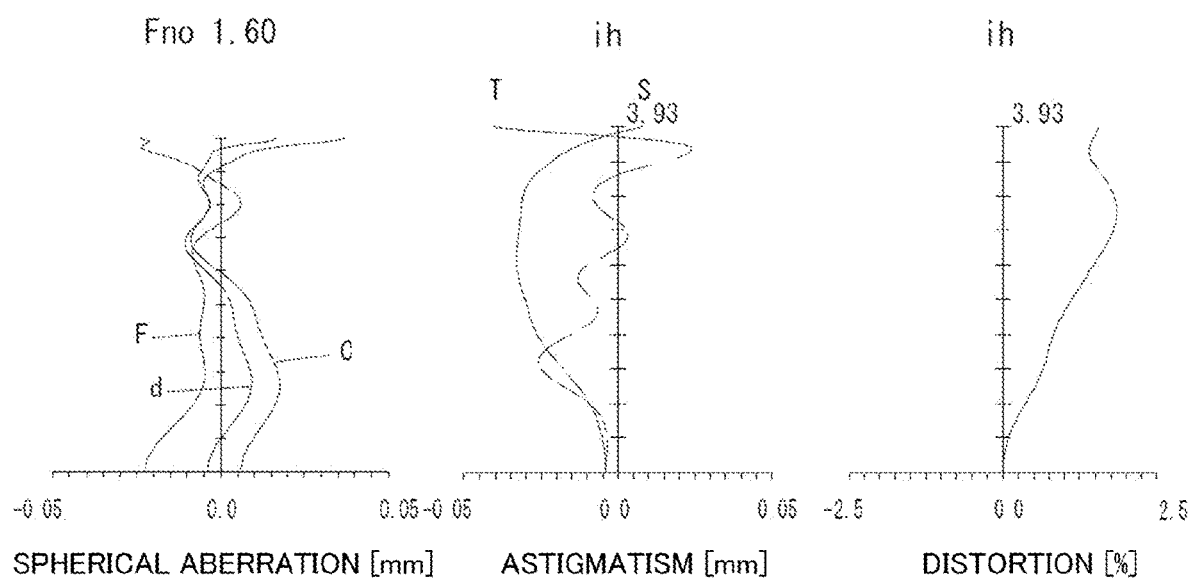
FIG. 20 shows spherical aberration, astigmatism, and distortion of the imaging lens in Example 10 according to the present invention.
Figure 21:
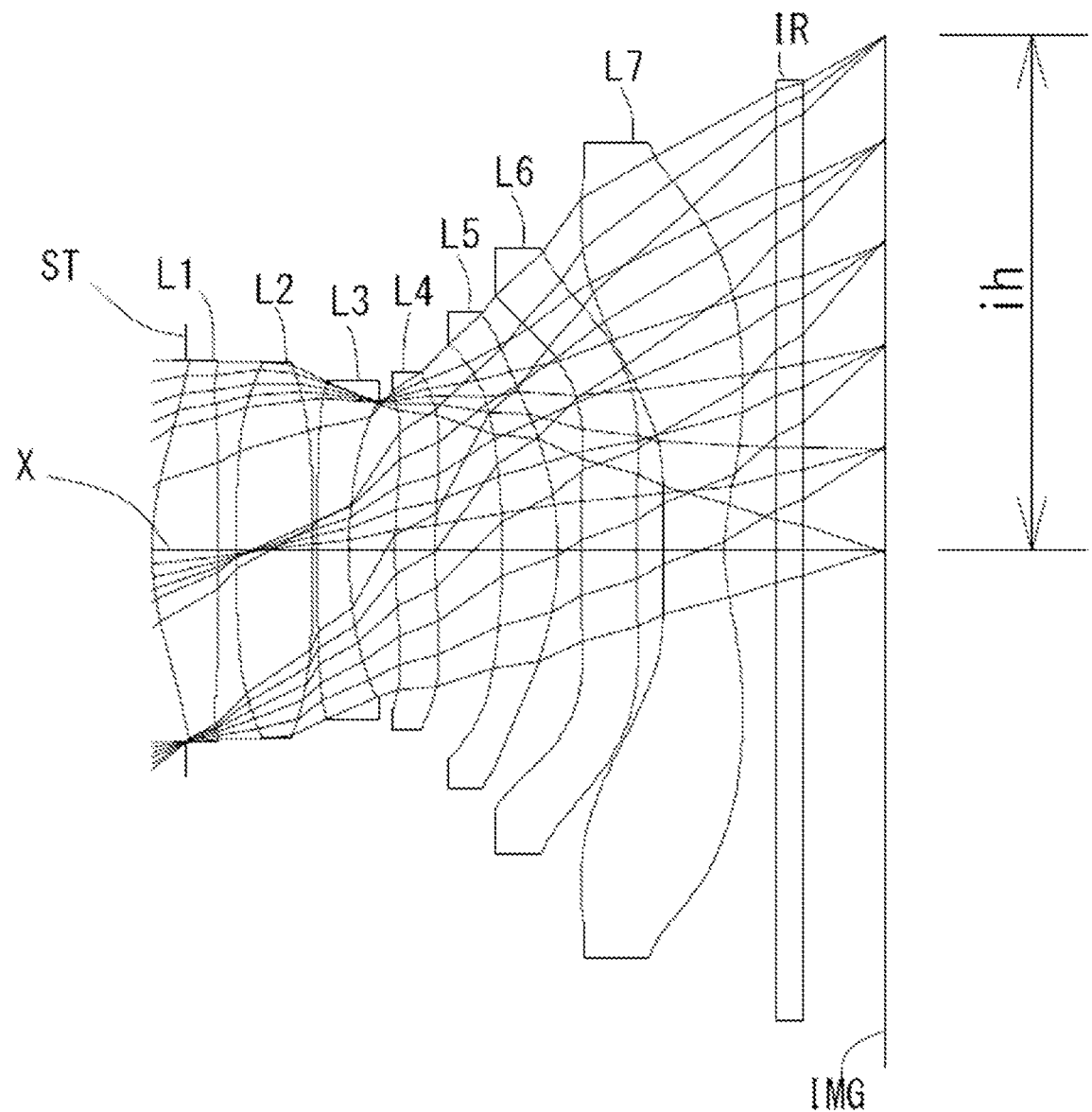
FIG. 21 is a schematic view showing an imaging lens in Example 11 according to the present invention.

FIG. 20 shows spherical aberration (mm), astigmatism (mm), and distortion (%) of the imaging lens in Example 10. As shown in FIG. 20, each aberration is corrected excellently.

Example 11

The basic lens data is shown below in Table 11.

TABLE 11

Example 11
Unit mm
f = 4.87 ih = 4.00 Fno = 1.60 TTL = 5.64 ω(°) = 38.9

Surface Data

| Surface Number 1 | Curvature Radius r | Surface Distance d | Refractive Index Nd | Abbe Number vd |
|---|---|---|---|---|
| (Object) | Infinity | Infinity | | |
| 1 (Stop) | Infinity | −0.2637 | | |
| 2* | 2.4030 | 0.5127 | 1.544 | 55.86 (vd1) |
| 3* | 21.5900 | 0.1384 | | |
| 4* | 10.0000 | 0.5998 | 1.535 | 55.86 (vd2) |
| 5* | −73.6085 | 0.0300 | | |
| 6* | 12.2834 | 0.2500 | 1.671 | 19.48 (vd3) |
| 7* | 3.7000 | 0.3599 | | |
| 8* | 4.3625 | 0.3129 | 1.671 | 19.48 (vd4) |
| 9* | 45.4395 | 0.5270 | | |
| 10* | −4.8344 | 0.4306 | 1.535 | 55.66 (vd5) |
| 11* | −2.0795 | 0.1766 | | |
| 12* | Infinity | 0.4369 | 1.661 | 20.37 (vd6) |
| 13* | Infinity | 0.2023 | | |
| 14* | 7.4327 | 0.4800 | 1.535 | 55.66 (vd7) |
| 15* | 1.6279 | 0.4000 | | |
| 18 | Infinity | 0.2100 | 1.517 | 64.20 |
| 19 | Infinity | 0.6387 | | |
| Image Plane | Infinity | | | |

Constituent Lens Data

| Lens | Start Surface | Focal Length | | Composite Focal Length |
|---|---|---|---|---|
| 1 | 2 | 4.921 | f67 | −4.013 |
| 2 | 4 | 16.503 | | |
| 3 | 6 | −7.980 | | |
| 4 | 8 | 29.390 | | |
| 5 | 10 | 6.471 | | |
| 6 | 12 | Infinity | | |
| 7 | 14 | −4.013 | | |

Aspheric Surface Data

| | Second Surface | Third Surface | Fourth Surface | Fifth Surface |
|---|---|---|---|---|
| k | −1.544824E+00 | −7.097198E+01 | 2.833414E+00 | 0.000000E+00 |
| A4 | −9.109778E−03 | −4.994766E−02 | −3.837275E−02 | −1.320921E−01 |
| A6 | −3.484367E−02 | −1.671014E−03 | 7.957702E−02 | 4.634813E−01 |
| A8 | 8.862121E−02 | 4.831542E−02 | −1.207124E−01 | −1.053586E+00 |
| A10 | −1.917818E−01 | −9.341315E−02 | 1.887281E−01 | 1.422553E+00 |
| A12 | 2.280127E−01 | 1.182434E−01 | −1.711865E−01 | −1.238757E+00 |
| A14 | −1.598743E−01 | −9.289086E−02 | 8.520949E−02 | 7.043552E−01 |
| A16 | 6.704978E−02 | 4.381053E−02 | −2.207744E−02 | −2.513186E−01 |
| A18 | −1.540539E−02 | −1.121085E−02 | 2.276796E−03 | 5.077028E−02 |
| A20 | 1.499265E−03 | 1.184518E−03 | 1.835322E−05 | −4.411004E−03 |

| | Sixth Surface | Seventh Surface | Eighth Surface | Ninth Surface |
|---|---|---|---|---|
| k | 0.000000E+00 | 2.066612E+00 | −4.684959E+00 | −2.545762E−01 |
| A4 | −1.222714E−01 | −3.593983E−02 | −7.352751E−02 | −6.722731E−02 |
| A6 | 5.033130E−01 | 9.025815E−02 | −2.111653E−02 | 6.573551E−03 |
| A8 | −1.153035E+00 | 3.064923E−02 | 8.389363E−02 | −3.315094E−02 |
| A10 | 1.625644E+00 | −4.649194E−01 | −1.487586E−01 | 3.721059E−02 |
| A12 | −1.513007E+00 | 9.975313E−01 | 1.383973E−01 | −2.300506E−02 |
| A14 | 9.413346E−01 | −1.092762E+00 | −6.811326E−02 | 6.095517E−03 |
| A16 | −3.416607E−01 | 6.819256E−01 | 1.425969E−02 | −1.450008E−04 |
| A18 | 8.316703E−02 | −2.294074E−01 | 0.000000E+00 | 0.000000E+00 |
| A20 | −7.956257E−03 | 3.242961E−02 | 0.000000E+00 | 0.000000E+00 |

| | Tenth Surface | Eleventh Surface | Twelfth Surface | Thirteenth Surface |
|---|---|---|---|---|
| k | −3.987671E−01 | −4.862325E+00 | 0.000000E+00 | 0.000000E+00 |
| A4 | 3.583437E−02 | 8.690351E−02 | 1.417701E−01 | 9.536261E−02 |
| A6 | −1.920796E−02 | −1.436646E−01 | −2.472084E−01 | −1.605159E−01 |
| A8 | −1.397487E−02 | 1.160389E−01 | 1.572725E−01 | 9.018394E−02 |
| A10 | 1.756701E−02 | −4.942707E−02 | −5.933663E−02 | −2.570038E−02 |

TABLE 11-continued

Example 11
Unit mm
f = 4.87 ih = 4.00 Fno = 1.60 TTL = 5.64 ω(°) = 38.9

| | | | | |
|---|---|---|---|---|
| A12 | −8.803902E−03 | 1.266168E−02 | 1.280936E−02 | 5.278418E−03 |
| A14 | 1.525615E−03 | −1.977735E−03 | −1.396227E−03 | −5.123742E−04 |
| A16 | 0.000000E+00 | 1.456658E−04 | 5.796751E−05 | 2.024527E−05 |
| A18 | 0.000000E+00 | 0.000000E+00 | 0.000000E+00 | 0.000000E+00 |
| A20 | 0.000000E+00 | 0.000000E+00 | 0.000000E+00 | 0.000000E+00 |

| | Fourteenth Surface | Fifteenth Surface |
|---|---|---|
| k | 4.621796E+00 | −8.947983E+00 |
| A4 | −2.429228E−01 | −1.145983E−01 |
| A6 | 1.106290E−01 | 5.594301E−02 |
| A8 | −2.777021E−02 | −1.624333E−02 |
| A10 | 4.370982E−03 | 2.852492E−03 |
| A12 | −4.291681E−04 | −3.011334E−04 |
| A14 | 2.403653E−05 | 1.742675E−05 |
| A16 | −5.877349E−07 | −4.195889E−07 |
| A18 | 0.000000E+00 | 0.000000E+00 |
| A20 | 0.000000E+00 | 0.000000E+00 |

The imaging lens in Example 11 satisfies conditional expressions (1) to (21) as shown in Table 12.

Figure 22:
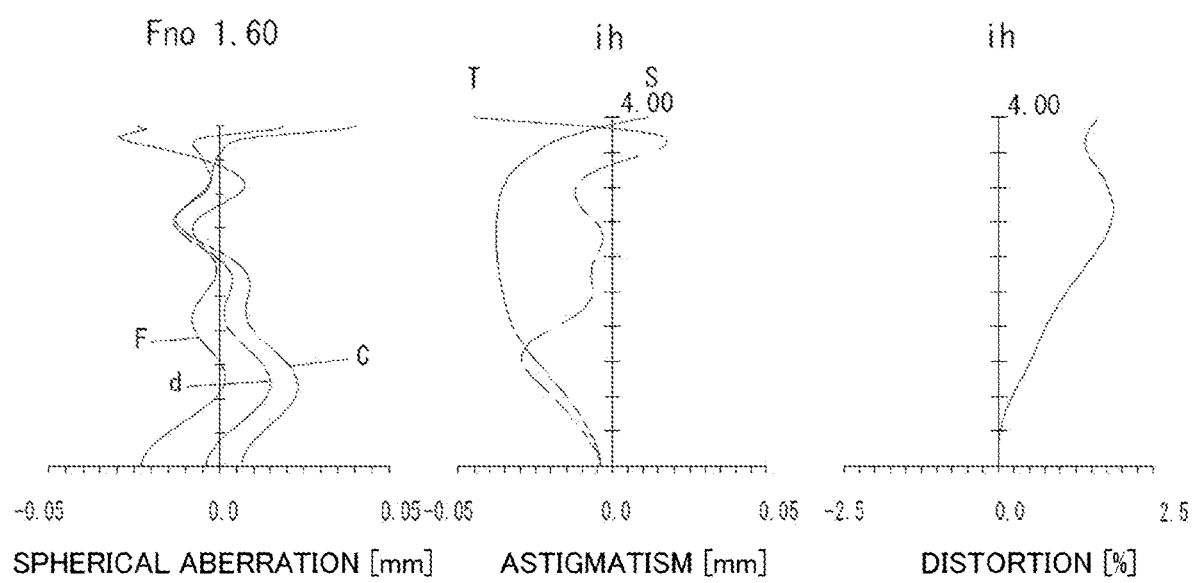
FIG. 22 shows spherical aberration, astigmatism, and distortion of the imaging lens in Example 11 according to the present invention.

FIG. 22 shows spherical aberration (mm), astigmatism (mm), and distortion (%) of the imaging lens in Example 11.

As shown in FIG. 22, each aberration is corrected excellently.

In table 12, values of conditional expressions (1) to (21) related to the Examples 1 to 11 are shown.

TABLE 12

| Conditional expression | Example 1 | Example 2 | Example 3 | Example 4 | Example 5 | Example 6 |
|---|---|---|---|---|---|---|
| (1) (D1/f1) × 100 | 4.82 | 4.74 | 5.97 | 5.46 | 5.65 | 3.97 |
| (2) T2/T4 | 0.06 | 0.06 | 0.07 | 0.06 | 0.06 | 0.06 |
| (3) vd4/(vd5 + vd6) | 0.27 | 0.27 | 0.27 | 0.26 | 0.26 | 0.26 |
| (4) (D5/f5) × 100 | 6.27 | 6.49 | 6.15 | 6.27 | 6.59 | 7.46 |
| (5) (T2/TTL) × 100 | 0.54 | 0.54 | 0.59 | 0.54 | 0.54 | 0.54 |
| (6) (T4/TTL) × 100 | 8.54 | 8.67 | 8.90 | 8.35 | 9.27 | 9.86 |
| (7) f4/f | 6.18 | 6.17 | 6.50 | 6.87 | 5.98 | 6.26 |
| (8) f5/f | 1.40 | 1.36 | 1.45 | 1.29 | 1.44 | 1.32 |
| (9) f7/f | −0.84 | −0.82 | −0.82 | −0.80 | −0.84 | −0.80 |
| (10) r7/f | 1.10 | 1.12 | 1.18 | 1.02 | 1.10 | 1.22 |
| (11) r8/f | 1.47 | 1.52 | 1.59 | 1.28 | 1.48 | 1.69 |
| (12) r9/f | −1.76 | −1.76 | −1.82 | −1.30 | −1.20 | −1.99 |
| (13) r13/f | 3.70 | 4.08 | 3.22 | 1.73 | 1.76 | 1.81 |
| (14) r6/r7 | 1.04 | 0.96 | 0.80 | 0.89 | 0.79 | 0.79 |
| (15) r7/r8 | 0.75 | 0.74 | 0.74 | 0.80 | 0.74 | 0.73 |
| (16) r8/r9 | −0.83 | −0.86 | −0.87 | −0.98 | −1.24 | −0.85 |
| (17) vd6/vd7 | 0.37 | 0.37 | 0.37 | 0.35 | 0.35 | 0.37 |
| (18) T1/T2 | 3.46 | 3.77 | 4.43 | 3.83 | 3.69 | 3.34 |
| (19) |f5/f7| | 1.67 | 1.69 | 1.77 | 1.61 | 1.71 | 1.66 |
| (20) f67/f | −0.84 | −0.82 | −0.82 | −0.80 | −0.84 | −0.80 |
| (21) r10/f | −0.54 | −0.53 | −0.55 | −0.48 | −0.48 | −0.53 |

| Conditional expression | Example 7 | Example 8 | Example 9 | Example 10 | Example 11 |
|---|---|---|---|---|---|
| (1) (D1/f1) × 100 | 4.14 | 3.97 | 10.94 | 10.47 | 10.42 |
| (2) T2/T4 | 0.06 | 0.06 | 0.06 | 0.06 | 0.06 |
| (3) vd4/(vd5 + vd6) | 0.26 | 0.26 | 0.26 | 0.26 | 0.26 |
| (4) (D5/f5) × 100 | 7.12 | 7.75 | 3.80 | 8.03 | 6.65 |
| (5) (T2/TTL) × 100 | 0.55 | 0.54 | 0.55 | 0.54 | 0.53 |
| (6) (T4/TTL) × 100 | 9.79 | 8.65 | 9.55 | 9.48 | 9.35 |
| (7) f4/f | 6.26 | 10.51 | 4.57 | 5.89 | 6.03 |
| (8) f5/f | 1.37 | 1.35 | 1.96 | 1.40 | 1.33 |
| (9) f7/f | −0.81 | −0.85 | −0.88 | −0.84 | −0.82 |
| (10) r7/f | 1.20 | 1.17 | 0.85 | 0.81 | 0.90 |
| (11) r8/f | 1.64 | 1.38 | 1.15 | 0.99 | 1.12 |
| (12) r9/f | −2.25 | −1.63 | −1.63 | −1.24 | −0.99 |
| (13) r13/f | 1.82 | 1.72 | 1.56 | 1.49 | 1.53 |
| (14) r6/r7 | 0.80 | 1.03 | 0.87 | 1.00 | 0.85 |
| (15) r7/r8 | 0.73 | 0.85 | 0.74 | 0.82 | 0.80 |
| (16) r8/r9 | −0.73 | −0.84 | −0.71 | −0.80 | −1.13 |
| (17) vd6/vd7 | 0.37 | 0.37 | 0.37 | 0.37 | 0.37 |
| (18) T1/T2 | 3.29 | 3.11 | 2.61 | 6.51 | 4.61 |

TABLE 12-continued

| | | | | | |
|---|---|---|---|---|---|
| (19) \|f5/f7\| | 1.69 | 1.59 | 2.24 | 1.56 | 1.61 |
| (20) f67/f | −0.81 | −0.85 | −0.88 | −0.84 | −0.82 |
| (21) r10/f | −0.56 | −0.51 | −0.65 | −0.48 | −0.43 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: an aperture stop,
L1: a first lens,
L2: a second lens,
L3: a third lens,
L4: a fourth lens,
L5: a fifth lens,
L6: a sixth lens,
L7: a seventh lens,
ih: a maximum image height,
IR: a filter, and
IMG: an image plane.

The invention claimed is:

1. An imaging lens comprising, in order from an object side to an image side,
   a first lens having a convex surface facing the object side near an optical axis and positive refractive power,
   a second lens,
   a third lens,
   a fourth lens,
   a fifth lens having a meniscus shape near the optical axis,
   a sixth lens, and
   a seventh lens having a concave surface facing the image side near the optical axis and negative refractive power, wherein
      an image-side surface of said seventh lens is formed as an aspheric surface having at least one pole point in a position off the optical axis,
      the first lens having a meniscus shape near the optical axis,
      an image-side surface of said fourth lens has a concave surface facing the image side near the optical axis,
      said fifth lens has positive refractive power near the optical axis,
      an object-side surface of said seventh lens has a convex surface facing the object side near the optical axis, and
      below conditional expressions (1), (2) and (7) are satisfied:

$$1.50 < (D1/f1) \times 100 < 17.00 \quad (1)$$

$$0.02 < T2/T4 < 0.10 \quad (2)$$

$$2.00 < f4/f < 16.00 \quad (7)$$

where
D1: a thickness along the optical axis of the first lens,
f1: a focal length of the first lens,
T2: a distance along the optical axis from an image-side surface of the second lens to an object-side surface of the third lens,
T4: a distance along the optical axis from an image-side surface of the fourth lens to an object-side surface of the fifth lens,
f4: a focal length of the fourth lens, and
f: the focal length of the overall optical system of the imaging lens.

2. The imaging lens according to claim 1, wherein a below conditional expression (5) is satisfied:

$$0.20 < (T2/TTL) \times 100 < 0.90 \quad (5)$$

where
T2: a distance along the optical axis from an image-side surface of the second lens to an object-side surface of the third lens, and
TTL: a total track length.

3. The imaging lens according to claim 1, wherein a below conditional expression (6) is satisfied:

$$6.70 < (T4/TTL) \times 100 < 15.00 \quad (6)$$

where
T4: a distance along the optical axis from an image-side surface of the fourth lens to an object-side surface of the fifth lens, and
TTL: a total track length.

4. The imaging lens according to claim 1, wherein a below conditional expression (9) is satisfied:

$$-1.40 < f7/f < -0.40 \quad (9)$$

where
f7: a focal length of the seventh lens, and
f: the focal length of the overall optical system of the imaging lens.

5. The imaging lens according to claim 1, wherein a below conditional expression (10) is satisfied:

$$0.40 < r7/f < 1.90 \quad (10)$$

where
r7: paraxial curvature radius of an object-side surface of the fourth lens, and
f: the focal length of the overall optical system of the imaging lens.

6. The imaging lens according to claim 1, wherein a below conditional expression (12) is satisfied:

$$-3.50 < r9/f < -0.50 \quad (12)$$

where
r9: paraxial curvature radius of an object-side surface of the fifth lens, and
f: the focal length of the overall optical system of the imaging lens.

7. The imaging lens according to claim 1, wherein a below conditional expression (14) is satisfied:

$$0.40 < r6/r7 < 1.60 \quad (14)$$

where
r6: paraxial curvature radius of an image-side surface of the third lens, and
r7: paraxial curvature radius of an object-side surface of the fourth lens.

8. The imaging lens according to claim 1, wherein a below conditional expression (13) is satisfied:

$$0.70 < r13/f < 6.50 \quad (13)$$

where
- r13: paraxial curvature radius of an object-side surface of the seventh lens, and
- f: the focal length of the overall optical system of the imaging lens.

9. The imaging lens according to claim 1, wherein a below conditional expression (16) is satisfied:

$$-1.90 < r8/r9 < -0.30 \qquad (16)$$

where
- r8: paraxial curvature radius of an image-side surface of the fourth lens, and
- r9: paraxial curvature radius of an object-side surface of the fifth lens.

* * * * *